(12) United States Patent
Matsui et al.

(10) Patent No.: US 12,135,537 B2
(45) Date of Patent: Nov. 5, 2024

(54) MACHINE TOOL, TOOL LOAD DISPLAYING METHOD FOR MACHINE TOOL, AND NON-TRANSITORY COMPUTER-READABLE STORAGE MEDIUM

(71) Applicant: Yamazaki Mazak Corporation, Niwa-gun (JP)

(72) Inventors: Jun Matsui, Niwa-gun (JP); Yuuki Yamamoto, Niwa-gun (JP); Takuro Katayama, Niwa-gun (JP); Morikuni Kimura, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 374 days.

(21) Appl. No.: 17/589,899

(22) Filed: Feb. 1, 2022

(65) Prior Publication Data
US 2022/0155750 A1   May 19, 2022

Related U.S. Application Data

(63) Continuation of application No. PCT/JP2019/031242, filed on Aug. 7, 2019.

(51) Int. Cl.
*G05B 19/4063* (2006.01)
*G06F 3/0484* (2022.01)

(52) U.S. Cl.
CPC ........ *G05B 19/4063* (2013.01); *G05B 2219/24015* (2013.01); *G06F 3/0484* (2013.01)

(58) Field of Classification Search
None
See application file for complete search history.

(56) References Cited

U.S. PATENT DOCUMENTS

| 4,739,488 A | 4/1988 | Asakura | |
|---|---|---|---|
| 2004/0193307 A1* | 9/2004 | Fujishima | G05B 23/0283 700/169 |
| 2006/0259181 A1* | 11/2006 | Kamiya | G05B 19/4093 700/87 |

(Continued)

FOREIGN PATENT DOCUMENTS

| JP | 61-86153 | 5/1986 |
|---|---|---|
| JP | 04-157506 | 5/1992 |

(Continued)

OTHER PUBLICATIONS

UMW, "Microsoft Excel Manual", University of Mary Washington, Oct. 2015, pp. 4, 28-33 (Year: 2015).*

(Continued)

*Primary Examiner* — David Earl Ogg
(74) *Attorney, Agent, or Firm* — MORI & WARD, LLP

(57) ABSTRACT

A tool load displaying method for a machine tool includes inputting a machining program that specifies a plurality of tools used during machining work and that specifies machining processes which constitute the machining work and each of which is performed by using each of the plurality of tools. At least one piece of load information corresponding to each of the plurality of tools during each of the at least one machining process is calculated. Selected load information is selected from the at least one piece of load information. The plurality of tools are displayed.

16 Claims, 20 Drawing Sheets

(56) References Cited

U.S. PATENT DOCUMENTS

| | | | |
|---|---|---|---|
| 2013/0096700 A1* | 4/2013 | Tezuka | G05B 19/4068 700/83 |
| 2014/0022086 A1* | 1/2014 | Tezuka | G05B 19/409 340/680 |
| 2014/0244024 A1 | 8/2014 | Tezuka | |
| 2016/0363925 A1* | 12/2016 | Oohashi | G05B 19/4065 |
| 2017/0146978 A1* | 5/2017 | Kawai | G05B 19/402 |
| 2017/0160724 A1* | 6/2017 | Kikata | B23Q 1/0045 |
| 2017/0277156 A1 | 9/2017 | Deguchi et al. | |
| 2018/0032054 A1* | 2/2018 | Kumagai | G05B 19/404 |
| 2018/0085877 A1* | 3/2018 | Agudelo | G05B 23/0275 |
| 2019/0196450 A1 | 6/2019 | Hanajima et al. | |

FOREIGN PATENT DOCUMENTS

| | | |
|---|---|---|
| JP | H05324043 A * | 12/1993 |
| JP | 11-296214 | 10/1999 |
| JP | 2003-58216 | 2/2003 |
| JP | 2004-126956 | 4/2004 |
| JP | 2004-227028 | 8/2004 |
| JP | 2013-037383 | 2/2013 |
| JP | 2014-164597 | 9/2014 |
| JP | 2017-004413 | 1/2017 |
| JP | 2017-174118 | 9/2017 |
| KR | 86-4621 U | 5/1986 |
| KR | 10-2014-0010317 | 1/2014 |

OTHER PUBLICATIONS

European Office Action for corresponding EP Application No. 19940324.7-1205, Jul. 11, 2023.
The International Preliminary Report on Patentability (Chapter I) with translation of Written Opinion for corresponding International Application No. PCT/JP2019/031242, Feb. 17, 2022.
European Office Action for corresponding EP Application No. 19940324.7-1205, Dec. 9, 2022.
European Search Report for corresponding EP Application No. 19940324.7-1205, Jun. 1, 2022.
European Office Action for corresponding EP Application No. 19940324.7-1205, Jun. 13, 2022.
Chinese Office Action for corresponding CN Application No. 201980098734.9, Jan. 12, 2023.
International Search Report for corresponding International Application No. PCT/JP2019/031242 Oct. 29, 2019.
Written Opinion for corresponding International Application No. PCT/JP2019/031242 Oct. 29, 2019.
Chinese Office Action for corresponding CN Application No. 201980098734.9, May 19, 2023.
Chinese Office Action for corresponding CN Application No. 201980098734.9, Jun. 23, 2022.

* cited by examiner

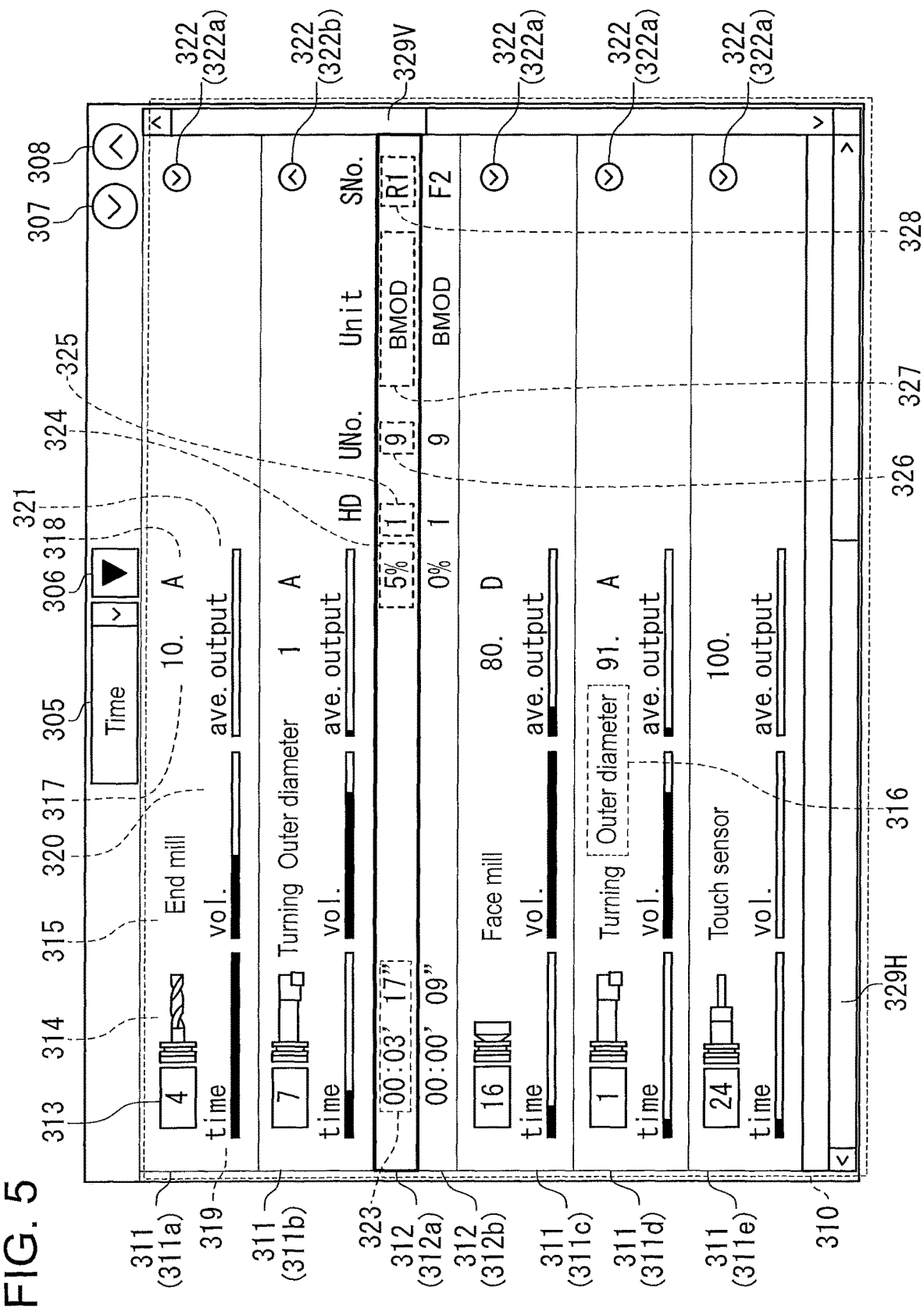

FIG. 6

| Kind of machining | Equation |
|---|---|
| Drilling | $P = (D \times Vc \times kc) \times (fr/Kc)^{(3/4)} / (280000 \times \eta)$ |
| Tapping | $P = (0.104 \times \tan\alpha \times Vc \times Kr \times K) \times (D-D1)^2 \times (D+2 \times D1) \times Vc / (24000 \times \eta \times D \times \pi)$ where prepared hole diameter $D1 = D - (1.082532 \times M \times Pte)$ |
| Inversed spot facing | |
| Boring | $P = (ae \times Vc \times kc) \times (fr/Kc)^{(3/4)} / (60000 \times \eta)$ |
| Back boring | |
| Face milling | $P = (Z \times ap \times ae \times Vc \times kc) \times (fr/(Kc \times Z))^{(3/4)} / (60000 \times \eta \times Ds \times \pi)$ |
| End milling | |
| Turning | $P = (ap \times Vc \times kc) \times fr^{(3/4)} / (60000 \times \eta)$ |
| Grooving | $P = (ae \times Vc \times kc) \times fr^{(3/4)} / (60000 \times \eta)$ |
| Turning drilling | $P = (D \times Vc \times kc) \times fr^{(3/4)} / (280000 \times \eta)$ |
| Turning tapping | $P = (0.104 \times \tan\alpha \times Vc \times Kr \times K) \times (D-D1)^2 \times (D+2 \times D1) \times Vc / (24000 \times \eta \times D \times \pi)$ where prepared hole diameter $D1 = D - (1.082532 \times M \times Pte)$ |

FIG. 14

| TNo. | Tool | Size | | Spindle Rotational direction Cutting edge orientation | Holder kind | R | Cutting angle | Cutting edge angle |
|---|---|---|---|---|---|---|---|---|
| 10 | Turning Outer diameter | 80.2 | F | ↙ | Normal | 0.8 | 95. | 80. |
| 10 | Turning Outer diameter | 80.2 | D | ↙ | Normal | 0.8 | 95. | 80. |
| 10 | Turning Outer diameter | 80.2 | B | ↻ | Normal | 0.8 | 95. | 80. |
| 10 | Turning Outer diameter | 80.1 | E | ↗ | Normal | 0.8 | 95. | 80. |
| 10 | Turning Outer diameter | 80.1 | C | ↗ | Normal | 0.8 | 95. | 80. |
| 10 | Turning Outer diameter | 80.1 | A | ↻ | Normal | 0.8 | 95. | 80. |
| 11 | Turning Outer diameter | 80.2 | F | ↙ | Normal | 0.8 | 95. | 80. |
| 11 | Turning Outer diameter | 80.1 | E | ↻ | Normal | 0.8 | 95. | 80. |

Tool data

OK

1/5

▲ ▼

MACHINE TOOL, TOOL LOAD DISPLAYING METHOD FOR MACHINE TOOL, AND NON-TRANSITORY COMPUTER-READABLE STORAGE MEDIUM

CROSS-REFERENCE TO RELATED APPLICATIONS

The present application is a continuation application of International Application No. PCT/JP2019/031242, filed Aug. 7, 2019. The contents of this application are incorporated herein by reference in their entirety.

BACKGROUND OF THE INVENTION

Field of the Invention

The present invention relates to a machine tool, a tool load displaying method for the machine tool, and a non-transitory computer-readable storage medium.

Discussion of the Background

JP 11-296214A discloses a numerical controller for a machine tool. The numerical controller includes a tool database and performs a simulation of an operation to indicate load information of a tool used in the operation.

SUMMARY OF THE INVENTION

According to one aspect of the present disclosure, a tool load display method includes inputting a machining program that specifies a plurality of tools used during machining work and that specifies machining processes which constitute the machining work and each of which is performed by using each of the plurality of tools. At least one piece of load information corresponding to each of the plurality of tools during each of the machining processes is calculated. The at least one piece of load information is assigned to each of the plurality of tools. Selected load information is selected from the at least one piece of load information. A displaying order of the plurality of tools is determined based on the selected load information assigned to each of the plurality of tools. The plurality of tools are displayed in the displaying order.

According to another aspect of the present disclosure, a machine tool includes a display, a memory, and a processor. The memory is to store a machining program that specifies a plurality of tools used during machining work and that specifies machining processes which constitute the machining work and each of which is performed by using each tool of the plurality of tools. The processor is configured to calculate at least one piece of load information corresponding to each of the plurality of tools during each of the machining processes. The processor is configured to assign the at least one piece of load information to each of the plurality of tools. The processor is configured to select selected load information from the at least one piece of load information. The processor is configured to determine a displaying order of the plurality of tools based on the selected load information assigned to each of the plurality of tools. The processor is configured to display the plurality of tools in the displaying order on the display.

According to the other aspect of the present disclosure, a non-transitory computer-readable storage medium stores a program for causing a computer to execute processing includes inputting a machining program that specifies a plurality of tools used during machining work and that specifies one machining processes which constitute the machining work and each of which is performed by using each tool of the plurality of tools. At least one piece of load information corresponding to each of the plurality of tools during each of the at least one machining process is calculated. The at least one piece of load information is assigned to each of the plurality of tools. Selected load information is selected from the at least one piece of load information. A displaying order of the plurality of tools is determined based on the selected load information assigned to each of the plurality of tools. The plurality of tools are displayed in the displaying order.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5 is an enlarged view of a sorting criterion selection interface, an order specifying interface, and a tool list window;

FIG. 6 illustrates a cutting power calculation method assigned on a machining-method basis;

FIG. 14 illustrates an example tool data window;

DESCRIPTION OF THE EMBODIMENTS

Figure 1:
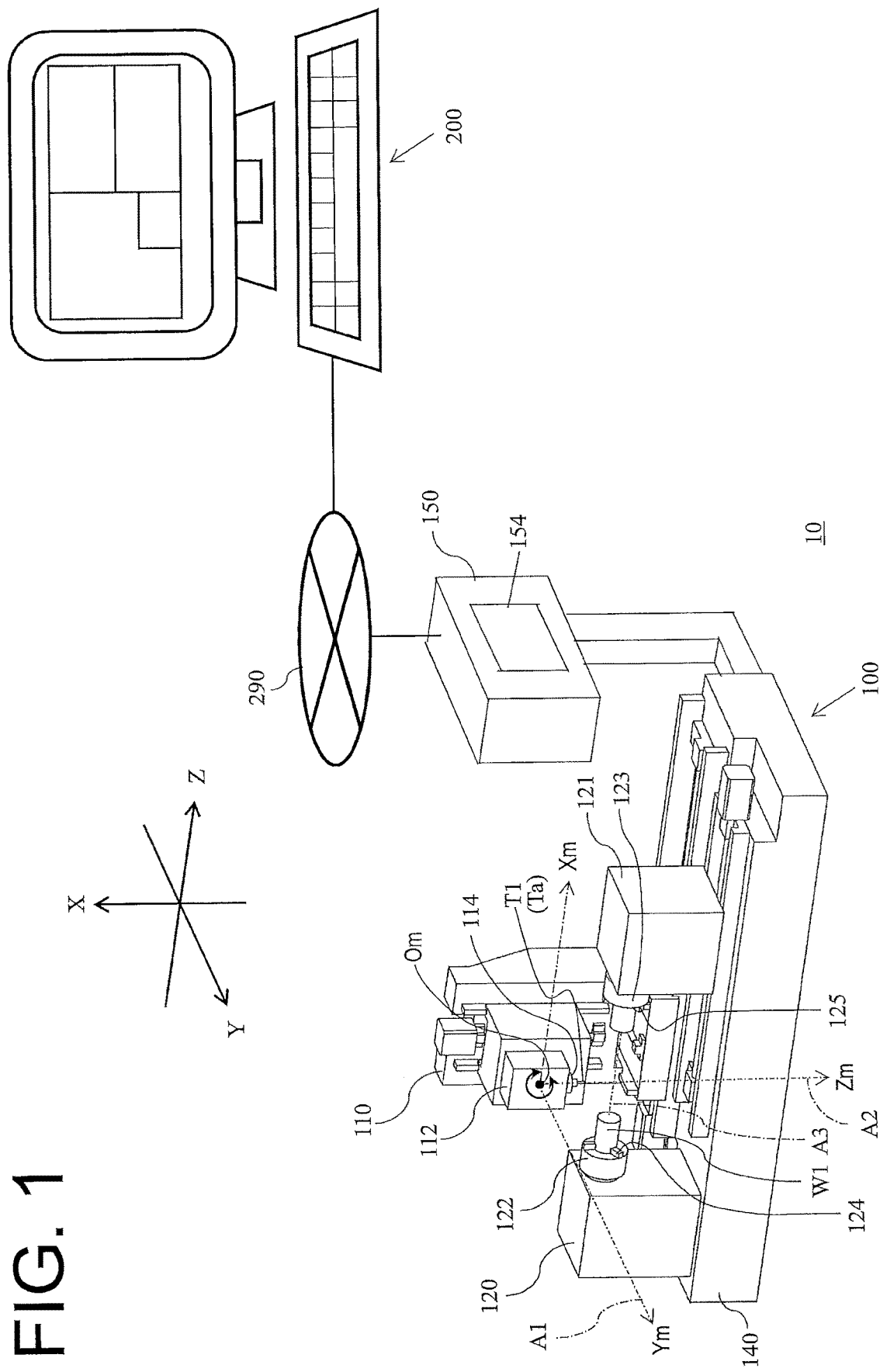
FIG. 1 illustrates a schematic configuration of a system that includes: a machine tool according to an embodiment; and a computer that displays load information of tools used in the machine tool.

The present invention will now be described with reference to the accompanying drawings, wherein like reference numerals designate corresponding or identical elements throughout the various drawings.

First Embodiment

FIG. 1 illustrates a schematic configuration of according to a system 10 according to this embodiment of the present invention. The system 10 includes a machine tool 100, a computer 200, and a network 290. The network 290 connects the machine tool 100 and the computer 200 to each other. A non-limiting example of the network 290 is a LAN (local area network) provided in a factory, a plant, or another industrial facility. While the network 290 illustrated is a wired network, the network 290 may be a wireless network. It is to be noted that as illustrated in FIG. 1, the X axis is along the height direction of the machine tool 100, the Y axis is along the depth direction of the machine tool 100, and the Z axis is along the width direction of the machine tool 100. This embodiment is in accordance with a JIS standard in that the Z axis is an axis parallel to rotation axis A3 of a first spindle 122, which holds a workpiece. In this embodiment, this coordinate system will be referred to as workpiece coordinate system.

The machine tool 100 performs machining on a workpiece W1. The machining includes at least one of turning, milling, drilling, threading, and spot facing. As illustrated in FIG. 1, the machine tool 100 includes a column 110, a first headstock 120, and a second headstock 121. The column 110, the first headstock 120, and the second headstock 121 are provided on a base 140.

The column 110 is movable in the Y axis direction and the Z axis direction on the base 140. A tool headstock 112 is mounted on the column 110. The tool headstock 112 is movable in the X axis direction relative to the column 110. The tool headstock 112 is swingable, relative to the column 110, about a swinging axis A1, which is along the Y axis direction. A tool spindle 114 is mounted on the tool headstock 112. The tool spindle 114 is rotatable about a rotation axis A2 relative to the tool headstock 112. The rotation axis A2 is orthogonal to the swinging axis A1. The tool spindle 114 is holding a tool Ta, which is a machining tool. As used herein, the term "machining tool" is intended to mean a concept encompassing a turning tool, a milling tool, a drilling tool, a threading tool, and a spot facing tool. The machine tool 100 further includes a tool exchanger, not illustrated, that exchanges the tool Ta with another tool. The tool Ta is exchanged as necessary, that is, based on the kind of machining performed on the workpiece W1.

In this embodiment, the intersection between the axis A1 and the axis A2 will be referred to as machine origin Om; the rotation axis A2 will be referred to as Zm axis; the swinging axis A1 will be referred to as Ym axis; an axis perpendicular to the Zm axis and the Ym axis will be referred to as Xm axis; and a coordinate system defined by these axes will be referred to as machine coordinate system. The direction extending from the machine origin Om toward the leading end of a first tool T1 will be regarded as positive direction of the Zm axis. The X axis of the workpiece coordinate system is rotated about the Y axis such that the positive direction of the X axis of the workpiece coordinate system is identical to the positive direction of the Xm axis of the machine coordinate system. This makes the positive direction of the Z axis of the workpiece coordinate system identical to the positive direction of the Zm axis of the machine coordinate system. The positive direction of the Y axis of the workpiece coordinate system will be regarded as the positive direction of the Ym axis of the machine coordinate system.

The first headstock 120 is fixed on the base 140. The first headstock 120 includes the first spindle 122. The first spindle 122 is rotatable about the rotation axis A3. The rotation axis A3 is along the Z axis direction. The first spindle 122 includes a first chuck 124. The first chuck 124 holds a first end of the workpiece W1. The second headstock 121 is provided on the base 140 and movable on the base 140 in directions parallel to the Z axis direction. The second headstock 121 includes a second spindle 123. The second spindle 123 is rotatable about the rotation axis A3. The second spindle 123 includes a second chuck 125. The second chuck 125 holds a second end of the workpiece W1. The second end is opposite to the first end of the workpiece W1 in the Z axis direction. When the machine tool 100 machines the second end of the workpiece W1, the first chuck 124 holds the workpiece W1. When the machine tool 100 machines the first end of the workpiece W1, the second chuck 125 holds the workpiece W1.

The machine tool 100 includes a controller 150. The controller 150 controls rotational motions about the rotation axes, swinging motions about the swinging axis, and movements in the axis directions. The controller 150 is connected to the base 140. It is to be noted that the controller 150 may be connected to another portion of the machine tool 100, or may be provided at a position apart from the base 140 insofar as the controller 150 is capable of transmitting control signals and/or receiving detection results.

Figure 2:
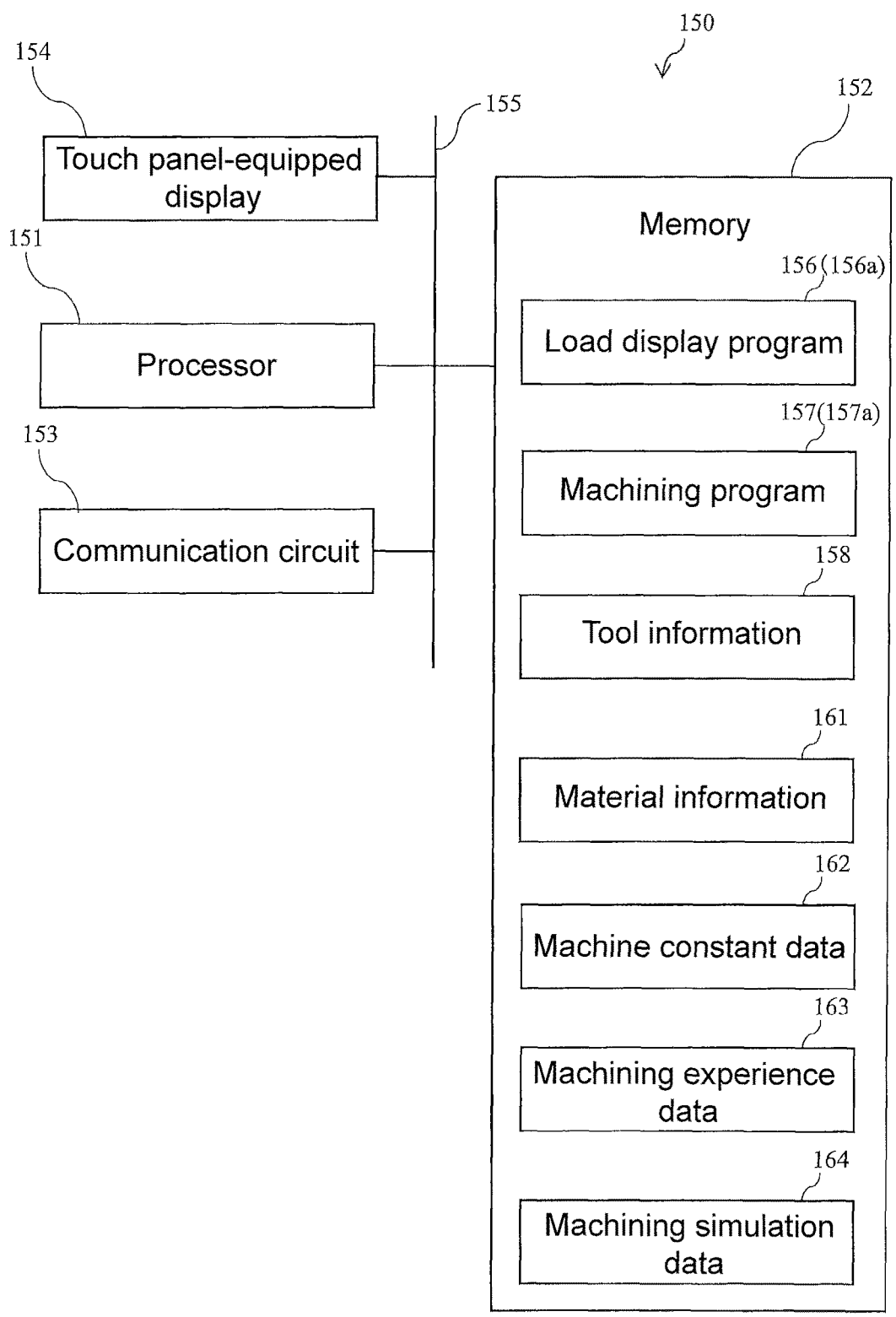
FIG. 2 is a hardware block diagram of a controller.

FIG. 2 is a hardware block diagram of the controller 150. As illustrated in FIG. 2, the controller 150 includes a processor 151, a memory 152, a communication circuit 153, and a touch panel-equipped display 154. The processor 151, the memory 152, the communication circuit 153, and the touch panel-equipped display 154 are connected to each other via a bus 155. The memory 152 is a computer-readable storage medium that stores programs necessary for machining, programs necessary for load display, and data necessary for these programs. The memory 152 may be provided inside the controller 150 or may be removable from the controller 150. The processor 151 reads a program stored in the memory 152 and executes the program that has been read. In this manner, the functions of the controller 150 are implemented. The functions implemented by the controller 150 include control of machining. Specifically, the memory 152 stores a machining program 157. The machining program 157 includes a control command for performing machining. The machining program 157 is usually edited in the computer 200, transmitted to the controller 150 via the network 290, and stored in the memory 152. The communication circuit 153 has functions necessary for communicating with the computer 200 via the network 290; specifically, a function of converting a communication packet into data, a function of converting data into a communication packet, and a function of transmitting and receiving communication packets.

In this embodiment, the memory 152 stores tool information 158, which is about tools Ta mountable on the machine tool 100. The tool information 158 includes T numbers corresponding to respective tools Ta, names of respective tools Ta, materials of respective tools Ta, dimensions of respective tools Ta, and usage states (wear states) of respective tools Ta. As used herein, the term "dimensions" of a tool Ta are intended to encompass nominal diameter of the tool Ta, tool length, tool diameter, axial offset, radial offset, teeth count, and cutting edge width. As used herein, the term "tool length" is intended to mean the length of the tool Ta in a direction along the rotation axis A2 (this direction will be hereinafter referred to as axial direction), assuming that the tool Ta is mounted on the tool spindle 114 and that the tool Ta is not worn (that is, the tool Ta is a new tool Ta). In other words, the tool length is the length of the tool Ta in the Zm axis direction in the machine coordinate system. As used herein, the term "tool diameter" is intended to mean the diameter of the tool Ta in a direction perpendicular to the rotation axis A2 (this direction will be hereinafter referred to as radial direction), assuming that the tool Ta is mounted on the tool spindle 114 and that the tool Ta is not worn (that is, the tool Ta is a new tool Ta). As used herein, the term "axial offset" is intended to mean the distance between the tool base of the tool Ta and the tool tip of the tool Ta in the axial direction, assuming that the tool Ta is mounted on the tool spindle 114 and that the tool Ta is not worn (that is, the tool Ta is a new tool Ta). As used herein, the term "tool base" of the tool Ta is intended to mean (assuming that the tool Ta is mounted on the tool spindle 114) one of two end points of the tool Ta in the axial direction that belongs to the portion of the tool Ta held by the tool spindle 114. In other words, the axial offset is the distance in the Zm axis direction between the tool base and the tool tip of the tool Ta in the machine coordinate system. As used herein, the term "radial offset" is intended to mean a coordinate value equivalent to the distance between the tool base of the tool Ta and the cutting edge of the tool Ta in the radial direction, assuming that the tool Ta is mounted on the tool spindle 114 and that the tool Ta is not worn (that is, the tool Ta is a new tool Ta). This coordinate value is the Xm coordinate value of the cutting edge of the tool Ta, assuming that the tool headstock 112 is taking the posture illustrated in FIG. 1 and that the tool Ta is mounted on the tool spindle 114. In order to determine the time to exchange the tool Ta, a user is able to determine the lifetime of the tool Ta and/or tool Ta-durable number of program execution and store lifetime and/or the count in the tool information 158. As used herein, the term "lifetime of the tool Ta" is intended to mean a cumulative total value of the time for which the tool Ta has been used. The cumulative total value is used as a standard of tool Ta exchanging time. As used herein, the term "tool Ta-durable number of program execution" is intended to mean a durable number of execution of the machining program 157 in which the tool Ta is used. The count is used as a standard of tool Ta exchanging time. No matter what kind of program the machining program 157 is, the tool Ta-durable number of program execution is decremented by 1 per execution of the machining program 157 using the tool Ta.

The memory 152 also includes material information 161, machine constant data 162, and machining experience data 163. The material information 161 includes: reference information of the material of the workpiece W1 to be machined (examples including name, material symbol, and ID); and the specific machining resistance value, kc, and the tapping resistivity factor, Kr, of the material. The machine constant data 162 is a parameter unique to the machine tool 100 used in calculating the load information of the tool Ta. The machine constant data 162 includes: mechanical efficiency $\eta$; motive power correction factor Kc; percentage of thread engagement Pte; thread flank angle $\alpha$; and thread tapping shape factor K. The machining experience data 163 is data that records the load that the tool Ta receives when the machining program 157 is executed. The machining experience data 163 will not be limited to the machining program 157 but may be log data of the tool Ta recorded from the activation time of the machine tool 100. The tool information 158 and the machining experience data 163 are transmitted by the communication circuit 153 to the computer 200 via the network 290. The tool information 158, the material information 161, the machine constant data 162, and the machining experience data 163 are read from the memory 152 at the time when a load display program 156, described later, is executed.

The load display program 156 further has a function of rewriting part of the machining program 157. The load display program 156 may have a function of a simulator of the machining program 157. At the time when the processor 151 executes the load display program 156, the processor 151 may output, as machining simulation data 164, a result of a simulation of the machining program 157. The memory 152 stores the machining simulation data 164. The memory 152 may have a volatile memory, and the machining simulation data 164 may be stored in the volatile memory. It is to be noted that operations of the load display program 156 will be detailed later.

The touch panel-equipped display 154 may be a single display 154 or may be a combination of a plurality of displays. It is to be noted that the "display" of the touch panel-equipped display 154 is a display example, and the "touch panel" of the touch panel-equipped display 154 is an interface example. It is also to be noted that the touch panel-equipped display 154 may be substituted with a combination of: a display without a touch panel; and input devices provided around the display, examples including buttons, switches, a lever, and a pointing device. In this case, the input devices are interface examples.

Figure 3:
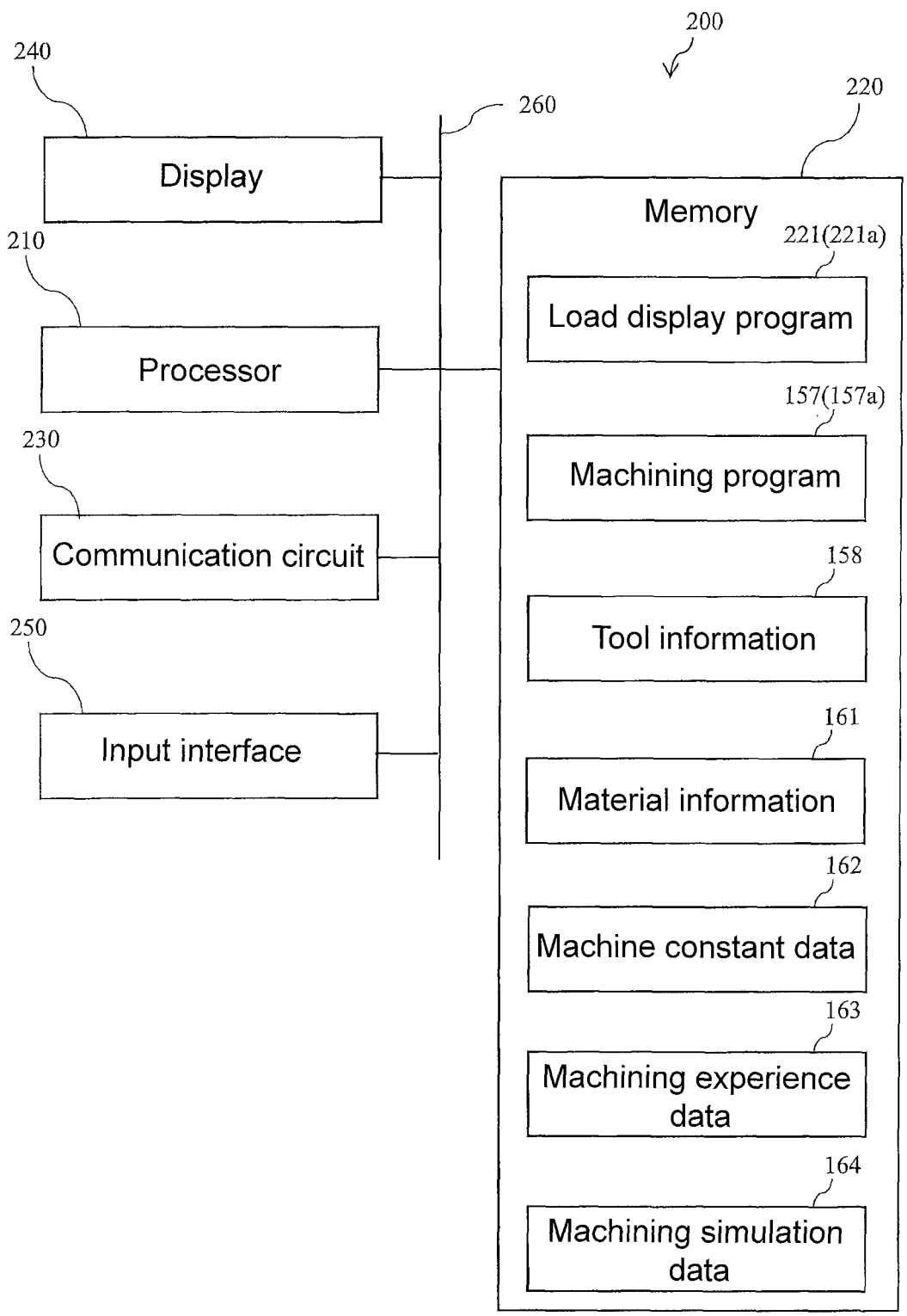
FIG. 3 is a hardware block diagram of a computer.

FIG. 3 is a hardware block diagram of the computer 200. As illustrated in FIG. 3, the computer 200 includes a processor 210, a memory 220, a communication circuit 230, a display 240, and an input interface 250. The processor 210, the memory 220, the communication circuit 230, the display 240, and the input interface 250 are connected to each other via a bus 260. The input interface 250 is an interface example. For example, the input interface 250 is a pointing device such as a keyboard and a mouse. It is to be noted that the computer 200 may be a combination in which the display 240 and the input interface 250 are integral to each other. A non-limiting example of such combination is a tablet computer provided with a touch panel-equipped display. It is also to be noted that the display 240 may be a combination of a plurality of displays.

The memory 220 is a computer 200-readable storage medium that stores the machining program 157, the tool information 158, the material information 161, the machine constant data 162, the machining experience data 163, the machining simulation data 164, a load display program 221, and a program such as an operating system. The memory 220 may be provided inside the computer 200 or may be removable from the computer 200. The load display program 221 has functions substantially identical to the functions of the load display program 156. It is to be noted, however, that the screen display method for displaying the load display program 221 may be partially different from the screen display method for displaying the load display program 156. The processor 210 reads a program stored in the memory 220 and executes the program that has been read. The memory 220 may have a volatile memory, and the machining simulation data 164 may be stored in the volatile memory. The communication circuit 230 has functions necessary for communicating with the computer 200 via the network 290; specifically, a function of converting a communication packet into data, a function of converting data into a communication packet, and a function of transmitting and receiving communication packets.

The machining program 157 is rewritten using the load display program 221, and the computer 200 transmits the machining program 157 thus rewritten to the controller 150 using the communication circuit 230. Upon execution of the load display program 221, the computer 200 receives latest tool information 158 and latest machining experience data 163 from the controller 150 using the communication circuit 230, and updates the tool information 158 and the machining experience data 163 stored in the memory 220.

Next, content of the machining program 157 will be described. In this specification, the machining program 157 according to the first embodiment and the machining program 157a according to the second embodiment are described in different program languages and thus use different methods for specifying tools, specifying workpiece motions (rotation and feed rate), and specifying tool motions (linear and curved movements, rotation). Under the circumstances, description will be first made with regard to those respects that are common to the machining program 157 according to the first embodiment and the machining program 157a according to the second embodiment. Then, details of the machining program 157 according to the first embodiment will be described. Details of the machining program 157a will be described in the second embodiment.

Generally, a machining program specifies a tool to be used and specifies motions of the workpiece and the tool for implementing machining using the tool. In this specification, a series of machining work specified by motions of a workpiece and a tool and performed during the time between the calling of the tool by the machining program and the calling of a next tool will be referred to as a machining process. As detailed in the second embodiment, in the machining program 157a according to the second embodiment, when a tool is called by the machining program and used to cut a workpiece, cutting conditions may change during the time between the calling of the tool and the calling of a next tool. The cutting conditions are defined by the cutting speed at which the tool cuts the workpiece, the cutting depth by which the tool cuts the workpiece, and the feed rate of the workpiece. In this case, among a series of machining work, those machining work performed under the same cutting conditions may be referred to as a machining process. It is to be noted that in the machining program 157 according to the first embodiment, the cutting conditions remain unchanged during the time between the calling of a tool by the machining program and the calling of a next tool.

In the first embodiment, at least the following content is defined in the machining program 157.

(1) Common unit: Material and shape of pre-machined workpiece W1.
(2) Basic coordinate unit: Method for setting the workpiece coordinate system and the machine coordinate system.
(3) Machining unit: Machining methods and machined shapes of parts of final machined shape.

The common unit, the basic coordinate unit, and the machining unit each include a unit number. The machining unit includes: information for identifying machining content; a tool sequence for setting a tool Ta and cutting conditions of the tool Ta; and a shape sequence for specifying a machined shape obtained in the machining unit. As used herein, the term "tool sequence" is intended to mean a series of machining stages necessary for forming a machined shape (for example, one bar material and one screw hole) of a part specified in the machining unit (examples of the series of machining stages include: a series of stages of rough processing and finishing processing; and in the case of threading, a series of stages of spotting, prepared hole processing, and tapping). In each machining stage, one tool is specified, and cutting conditions are specified. Therefore, in the first embodiment, one stage of the tool sequence corresponds to the above-described machining process. As used herein, the term "shape sequence" is intended to mean a code defining a target shape in the machining unit. For example, in turning, the shape sequence means an aggregation of segments defined by parameters for determining a machined shape, such as: a start point and an end point of the cutting edge of a tool in the workpiece coordinate system; and a connection relationship indicating how the start point and the end point are connected to each other (such as by way of a line or an arc). It is to be noted, however, that the thread pitch is specified in information for identifying the machining content of the machining unit. In the machining program 157, motions of the workpiece W1 are specified by the machining processes of the tool sequence, and motions of the tool Ta are automatically calculated by the machine tool 100 based on: the tool kind and cutting conditions specified by the machining processes of the tool sequence; the unit name of the machining unit; and the shape sequence.

Thus, the machining program 157 specifies a plurality of tools Ta used during machining work and that specifies machining processes which constitute the machining work and each of which is performed by using each tool of the plurality of tools Ta. In the machining process, the tool Ta and the cutting conditions of the tool Ta for implementing the process of the machining stage are defined. In the at least one machining process, at least one of the following is defined: the cutting depth of each tool of the plurality of tools Ta relative to the workpiece; the feed rate of the workpiece; the cutting speed of cutting the workpiece; and the rotational speed (spindle rotational speed) of the spindle configured to rotate the workpiece or each of the plurality of tools. The cutting conditions of the tool Ta in the first embodiment will be defined in more detail. The cutting conditions of the tool Ta include cutting speed Vc, tool rotational speed n, feed rate, and cutting depth. The cutting conditions may be referred to as cutting parameters. The cutting speed Vc (m/min) is obtained from the equation "Vc=π×D nw/1000", where nw (min$^{-1}$) denotes workpiece spindle rotational speed and D (mm) denotes workpiece diameter. Thus, the cutting conditions of the tool Ta may be regarded as including the workpiece spindle rotational speed nw. The tool rotational speed n and the workpiece spindle rotational speed nw will be collectively and simply referred to as spindle rotational speed. The feed rate includes feed per revolution fr and feed per minute Vf of the spindle. The cutting depth includes at least one of: the axial cutting depth, ap, of the workpiece rotation axis or the tool rotation axis; and the radial cutting depth, ae, of the workpiece rotation axis or the tool rotation axis. Thus, in the first embodiment, the parameters defining the machining process include the tool Ta used, a sign indicating the machining stage, the cutting speed Vc, the spindle rotational speed nw, the tool rotational speed n, the feed rates fr and Vf, and the cutting depths ap and ae. The parameters defining the machining process further include: information for identifying the stage of the machining process (examples including rough processing, finishing processing, spotting, prepared hole processing, and tapping); and a number indicating the order in which the machining process is performed in the machining unit to which the machining process belongs (this number will be hereinafter occasionally referred to as tool sequence number). For example, assume that in the machining program 157, the machining process of rough processing is defined as number 1 in the tool sequence and that the machining process of finishing processing is defined as number 2 in the tool sequence. Under this assumption, the machining process of rough processing is performed first, and then the machining process of finishing processing is performed. Also, the tool Ta and the cutting conditions of the tool Ta defined in the machining process are applied to the entirety of the shape sequence in the same machining unit.

General Display Screen

Figure 4:
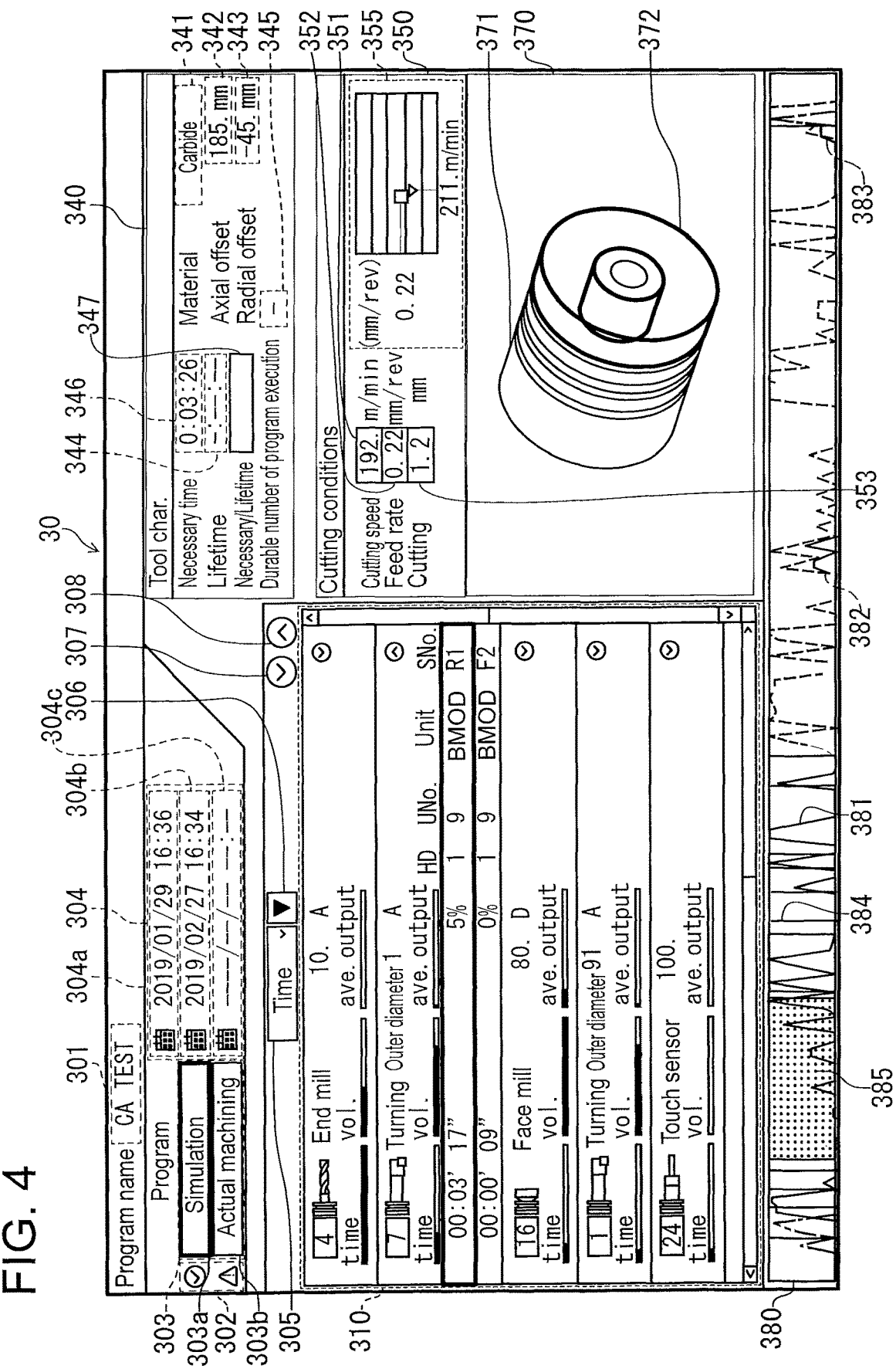
FIG. 4 illustrates an example display screen of a load display program according to a first embodiment.

FIG. 4 illustrates an example display screen 30 of the load display program 221 according to this embodiment. The display screen 30 is displayed on the display 240. It is to be noted that a display screen showing the load display program 156 in the touch panel-equipped display 154 of the controller 150 is substantially identical to the display screen 30, with an exception described later. The display screen 30 includes a machining program name 301, a data status indicator 302, a data selector 303, a data creation time indicator 304, a sorting criterion selection interface 305, an order specifying interface 306, a machining process display interface 307, a machining process non-display interface 308, a tool list window 310, a tool characteristics display window 340, a cutting conditions display window 350, a cut part display window 370, and a tool load time-series graph 380. In FIG. 4 and some later drawings, namely, FIGS. 5, 7, 9, 12, 14, 16, 17, 18, and 19, a quadrangle is indicated by dotted lines. This quadrangle is added for display content identifying purposes, and is not displayed on the display 240 (154) in actual situations.

The machining program name 301 indicates a file name of the machining program 157. At the start time of execution of the load display program 221 (156), a window for specifying the machining program 157 is displayed, and the file name of the machining program 157 specified is displayed as the machining program name 301 on the display screen 30. It is to be noted, however, that when the controller 150 and the computer 200 include additional information for identifying the machining program 157, the machining program name 301 may be this additional information, instead of the file name.

The data status indicator 302 indicates whether the update dates of the machining experience data 163 and the machining simulation data 164 are new or old, instead of indicating the update date of the machining program 157 identified by the machining program name 301 (when a reference is made to the machining program 157 in the following description of the display screen 30, the machining program 157 is intended as the machining program 157 identified by the machining program name 301, unless noted otherwise). It is to be noted, however, that when the machining experience data 163 and the machining simulation data 164 do not exist, the update dates are regarded as old. FIG. 4 illustrates a case where while the update date of the machining simulation data 164 is newer than the update date of the machining program 157, the machining experience data 163 does not exist. In the data status indicator 302, statuses of the update dates of the machining experience data 163 and the machining simulation data 164 are indicated by predetermined pictorial symbols. It is possible, however, to indicate the presence and absence of the data using any other pictorial symbols or text. Also, when none of the machining experience data 163 and the machining simulation data 164 exists, the processor (210) (151) may perform a simulation of the machining program 157 at the start time of execution of the load display program 221 (156), and generate the machining simulation data 164.

The data selector 303 is an interface for specifying whether to use the machining experience data 163 or the machining simulation data 164 to obtain the load information of the tool Ta. FIG. 4 illustrates a state in which a button 303a, which is for selecting the machining simulation data 164, and a button 303b, which is for selecting the machining experience data 163, are displayed as selectable and in which the button 303a is selected. It is to be noted, however, that the data selector 303 may be any other interface insofar as either the machining experience data 163 or the machining simulation data 164 is selectable on the interface. For example, the data selector 303 may be a graphic user interface (GUI) such as a radio button, a drop-down list, and a list box.

The data creation time indicator 304 indicates creation date-time 304a of the machining program 157, creation date-time 304b of the machining simulation data 164, and creation date-time 304c of the machining experience data 163. In the example illustrated in FIG. 4, the machining experience data 163 is not created yet, and its creation date-time 304c is indicated by dashes.

The sorting criterion selection interface 305 is an interface for selecting a sorting criterion specifying the display order in which the tools Ta are displayed in the tool list window 310. FIG. 5 is an enlarged view of the sorting criterion selection interface 305 and of the order specifying interface 306 and the tool list window 310, which will be described later. FIGS. 4 and 5 illustrate an example in which the sorting criterion selection interface 305 is a drop-down list from which any one of the following is selectable: the usage time for which the tool Ta is used; the volume of the cut part that is cut by the tool Ta; the path length of the tool Ta for cutting work; the average value of the cutting power parameter; the peak value of the cutting power parameter; and the cutting work order. It is to be noted, however, that the sorting criterion selection interface 305 may be any other interface on which the sorting criterion is selectable from any one of the usage time, the volume, the total path length, the average output, the maximum output, and the cutting work order (for example, a radio button, a list box, and a button for selecting one of the above-described options). At the time of activation of the load display program 221 (156), a default value of the sorting criterion is selected. For example, the default value may be the above-described cutting work order, or a prior sorting criterion selected as of the end of execution of the previous load display program 221 (156). In this embodiment, the usage time of tool Ta, the volume of the cut part that is cut by the tool Ta, the path length of the tool Ta for cutting work, the average value of the cutting power parameter corresponding to cutting power applied to tool Ta, and the peak value of the cutting power parameter will be collectively referred to as load information of tool Ta. The load information of tool Ta represents usage conditions of the tool which cause degradation of the tool Ta. For example, at least one piece of the load information of tool Ta includes at least one of: the usage time for which each tool is used in the machining process; the volume of a cut part that is cut by each tool in the machining process; the length of a path of each tool in the machining process; the average value of the cutting power parameter corresponding to cutting power applied to the tools in the machining process; and the maximum value of the cutting power parameter in the machining process. The usage time and the path length are values affecting the machining time as a whole, and the average value of the cutting power parameter and the peak value of the cutting power parameter are values affecting the tool lifetime. In light of this fact, these values are important for reviewing the machining process. It is to be noted that the load information of the tool Ta selected on the sorting criterion selection interface 305 will be referred to as selected load information.

The cutting power parameter is a general concept encompassing: an estimated value of the cutting power applied to the tool Ta; and power ratio, which is a ratio between a continuous rated output of a motor that applies the cutting power to the tool Ta and actual output power of the motor for applying the cutting power. That is, the cutting power parameter includes at least one of the estimated value of the cutting power and the power ratio. The cutting power is a value affecting the tool lifetime, and the power ratio is a value that not only affects the tool lifetime but also is helpful in determining whether there is room for increasing the output power of the motor in order to shorten the machining time as a whole. The estimated value of the cutting power applied to tool Ta can be calculated in the manner described below. The nominal diameter of the tool Ta, the tool diameter, the teeth count, Z, and the cutting edge width, which are stored as the tool information 158, will be denoted as D, Ds, Z, and De, respectively. The specific machining resistance value and the tapping resistivity factor, which are stored as the material information 161, will be denoted as kc and Kr, respectively. The mechanical efficiency, the motive power correction factor, the percentage of thread engagement, the flank angle, and the tapping shape factor, which are stored as the machine constant data 162, will be denoted as η, Kc, Pte, a, and K, respectively. The cutting speed, the feed per revolution, the axial cutting depth of the workpiece rotation axis or the tool rotation axis, and the radial cutting depth of the workpiece rotation axis or the tool rotation axis, which are defined in the machining process, will be denoted as Vc, fr, ap, and ae, respectively. The thread pitch set in the information for identifying the machining content of the machining unit will be denoted as M. With relevant items thus denoted, the estimated value P of the cutting power can be calculated on a machining-kind basis as illustrated in FIG. 6. That is, the processor (210) (151) is able to calculate the cutting power parameter based on the cutting depths ap and ae, the feed rate fr, and the cutting speed Vc. It is to be noted that the kind of machining is identifiable from the information for identifying the machining content of the machining unit. In performing a simulation of the machining program 157, the processor (210) (151) outputs the estimated value of the cutting power thus calculated to the machining simulation data 164.

The power ratio is obtained in the manner described below. In turning, the cutting power applied to the tool Ta is generated by the motor that rotates one of the first spindle 122 and the second spindle 123 that is holding the workpiece W1. Thus, in turning, the motor that rotates one of the first spindle 122 and the second spindle 123 that is holding the workpiece W1 is the motor that applies the cutting power to the tool Ta. In this case, the ratio of the output power of this motor to its continuous rated output can be calculated as the power ratio. In milling, drilling, threading, and spot facing, the cutting power applied to tool Ta is generated by the motor that rotates the tool spindle 114. Thus, in milling, drilling, threading, and spot facing, the motor that rotates the tool spindle 114 is the motor that applies the cutting power to the tool Ta. In this case, the ratio of the output power of this motor to its continuous rated output can be calculated as the power ratio. It is to be noted that in milling, drilling, threading, and spot facing, in order to maintain the posture of the workpiece W1 during machining, an output is made also from the motor that rotates one of the first spindle 122 and the second spindle 123 that is holding the workpiece W1. In this case, the machine tool 100 may: calculate a power ratio for each of the motors that rotate the respective spindles 114, 122, and 123 by the above-described method; and output the power ratio calculated to the machining experience data 163.

When one of the estimated value of the cutting power and the power ratio is known, the processor (210) (151) may convert the other one of the estimated value of the cutting power and the power ratio in the following manner. In the machine tool 100, the continuous rated output of each of the motors that rotate the respective spindles 114, 122, and 123 depends on the rotational speed. The machine constant data 162 includes a table that shows a relationship between the continuous rated output and the rotational speed of each of the motors that rotate the respective spindles 114, 122, and 123. The processor (210) (151) may obtain the rotational speed of each of the spindles 114, 122, and 123 by: detecting a target rotational speed from the cutting speed Vc or the spindle rotational speed defined in the machining process in the machining program 157; or detecting a rotational speed from the output value of a sensor that detects the rotational speed of each of the spindles 114, 122, and 123, which are provided in the machine tool 100. The processor (210) (151) may refer to the table to obtain the continuous rated output from the rotational speed obtained. Thus, when the estimated value of the cutting power is known, the processor (210) (151) may obtain the power ratio by dividing the estimated value of the cutting power by the continuous rated output obtained. When the power ratio is known, the processor (210) (151) may obtain the estimated value of the cutting power by multiplying the obtained power ratio by the continuous rated output obtained. That is, the cutting power parameter may be a concept further encompassing the estimated value of the cutting power obtained by multiplying the power ratio output from the machine tool 100 by the continuous rated output.

Upon selection of the average value of the cutting power parameter on the sorting criterion selection interface 305 with the machining experience data 163 in selected state, the processor (210) (151) reads the power ratio from the machining experience data 163, and obtains the average value of the cutting power parameter for each of all the machining processes performed per execution of the machining program 157. Another possible example is that the processor (210) (151) may read the power ratio from the machining experience data 163, calculate an estimated value of the cutting power, and obtain an average value of the estimated value. Upon selection of the average value of the cutting power parameter on the sorting criterion selection interface 305 with the machining simulation data 164 in selected state, the processor (210) (151) reads, from the machining simulation data 164, an estimated value of the cutting power or a converted value of the power ratio, and obtains the average value of the cutting power parameter for each of all the machining processes performed per execution of the machining program 157. Then, based on the tool Ta used in the machining process, the processor (210) (151) assigns the obtained average value on a tool-Ta basis. Then, the processor (210) (151) determines the display order in which the tools Ta are displayed in the tool list window 310. In determining the display order, the processor (210) (151) uses, as a reference, the largest value of average values of more than one machining process assigned on a tool-Ta basis. Thus, the processor (210) (151) performs processing of: calculating at least one piece of load information in the at least one machining process performed using each tool; obtaining a maximum value of values of the selected load information in all the at least one machining process performed using the tools; and displaying the plurality of tools in turn based on the maximum value. Obtaining a sum of average values of the selected load information may result in a large value of sum if there is a large number of machining processes, even if the average value of the selected load information in an individual machining process is small. In this case, it is difficult to review the machining process. In light of this, the maximum value of average values assigned on a tool-Ta basis is used as a reference. This makes it easier to find a machining process to be reviewed.

In the case where the peak value of the cutting power parameter is selected on the sorting criterion selection interface 305, the processing perforated is approximately the same as the processing performed in the case where the average value of the cutting power parameter is selected. The processor (210) (151) obtains the cutting power parameter for each of all the machining processes performed per execution of the machining program 157. In obtaining the cutting power parameter, the processor (210) (151) uses a method similar to the method used when the average value of the cutting power parameter is selected from the machining experience data 163 or the machining simulation data 164. Then, the processor (210) (151) obtains the peak value of the obtained cutting power parameter for each of all the machining processes performed per execution of the machining program 157. Then, based on the tool Ta used in the machining process, the processor (210) (151) assigns the obtained peak value on a tool-Ta basis. The processor (210) (151) determines the display order in which the tools Ta are displayed in the tool list window 310. In determining the display order, the processor (210) (151) uses, as a reference, the largest value of the peak values of more than one machining process assigned on a tool-Ta basis. In this case as well, the processor 210 can be regarded as performing processing of: calculating at least one piece of load information in the at least one machining process performed using each tool; obtaining a maximum value of values of the selected load information in all the at least one machining process performed using the tools; and displaying the plurality of tools in turn based on the maximum value. This case is also similar to the above-described case in that the effect of making it easier to find a machining process to be reviewed is provided.

The volume of the cut part that is cut by the tool Ta is calculated from: the shape of a 3D model of the post-machined workpiece W1 related to the machining unit; and the shape of the pre-machined workpiece W1 defined in the common unit. In executing the machining program 157, the machine tool 100 outputs the value of the volume as the machining experience data 163. In performing a simulation of the machining program 157, the processor (210) (151) outputs the volume of the cut part thus calculated to the machining simulation data 164. Thus, when the volume of the cut part that is cut by the tool Ta is selected on the sorting criterion selection interface 305, the processor (210) (151) extracts, from the machining experience data 163 or the machining simulation data 164, volumes of cut parts for all the machining processes performed per execution of the machining program 157. Then, the processor (210) (151) assigns the volumes on a tool-Ta basis. Then, the display order in which the tools Ta are displayed in the tool list window 310 is determined based on the sum of the volumes of the cut part assigned on a tool-Ta basis.

the path length of the tool Ta for cutting work can be calculated from: the shape of the pre-machined workpiece W1 defined in the common unit; the cutting depths ap and ae obtained from the machining process in which the tool Ta is used; the dimensions and worn state of the tool Ta obtained from the tool information 158; and the post-machined surface shape obtained from the shape sequence included in the same machining unit in which the tool sequence in which the tool Ta is used is included. For example, as recited in JP 2006-053945A, it is possible to: obtain a shape of the cut part from a difference between the shape of the pre-machined workpiece W1 defined in the common unit and the post-machined surface shape obtained from the shape sequence; divide the obtained shape into a solid model that can be cut by reciprocating motion of the tool Ta; and based on, for example, the cutting depths ap and ae, specify a tool path extending throughout the solid model. In executing the machining program 157, the machine tool 100 outputs an actual tool path as the machining experience data 163. In performing a simulation of the machining program 157, the processor (210) (151) outputs the above-determined tool path to the machining simulation data 164. Thus, when the path length of the tool Ta for cutting work is selected on the sorting criterion selection interface 305, the processor (210) (151) reads the actual path of the tool Ta from the machining experience data 163 or reads, from the machining simulation data 164, the tool path obtained by a calculation. Then, the processor (210) (151) obtains tool paths for all the machining processes performed per execution of the machining program 157, and obtains path lengths of the respective tool paths. Then, the processor (210) (151) assigns the obtained path lengths on a tool-Ta basis. Then, the display order in which the tools Ta are displayed in the tool list window 310 is determined based on the sum of the path lengths assigned on a tool-Ta basis.

The usage time of tool Ta may be calculated by dividing the above-described path length by the feed per minute Vf. Thus, when the usage time of tool Ta is selected on the sorting criterion selection interface 305, the processor (210) (151) may calculate the path length by the above-described method for each of all the machining processes performed per execution of the machining program 157, and obtain the usage time from the path length based on the feed per minute Vf. Another possible example is that in executing the machining program 157, the machine tool 100 may relate an actual tool position to the work time and output them as the machining experience data 163. Thus, the processor (210) (151) may read the machining experience data 163 and obtain the usage time for each of all the machining processes performed per execution of the machining program 157. Then, the processor (210) (151) assigns the obtained usage time on a tool-Ta basis. Then, the display order in which the tools Ta are displayed in the tool list window 310 is determined based on the sum of the usage times assigned on a tool-Ta basis.

The cutting work order in the machining processes is determined by the machining unit calling order in the machining program 157 and a number indicating the order in which the machining processes in the machining unit are performed. While the machining unit calling order in the machining program 157 is generally in unit numerical order of the machining program 157, the machining unit calling order may not necessarily be in this order. Thus, when the cutting work order is selected on the sorting criterion selection interface 305, the processor (210) (151) assigns the cutting work order determined by the above-described method on a tool-Ta basis for each of all the machining processes performed per execution of the machining program 157. Then, the display order in which the tools Ta are displayed in the tool list window 310 is determined based on the earliest work order among the work orders assigned on a tool-Ta basis.

The order specifying interface 306 is an interface for specifying, based on the sorting criterion selected on the sorting criterion selection interface 305, the order (decreasing order/ascending order) in which the tools Ta are displayed in the tool list window 310. At the time of activation of the load display program 221 (156), the order selected as a default value is, for example, decreasing order or a prior order selected as of the end of execution of the previous load display program 221 (156). FIGS. 4 and 5 illustrate an example in which the usage time of tool Ta is selected as the sorting criterion on the sorting criterion selection interface 305, and decreasing order is specified on the order specifying interface 306. In these figures, the order specifying interface 306 is displayed in the form of an icon of a pointing-down triangle. Upon manipulation of the order specifying interface 306 by way of an operation such as tapping and clicking, an icon of a pointing-up triangle is displayed and ascending order is specified. It is to be noted that the order specifying interface 306 will not be limited to the display form illustrated in FIGS. 4 and 5 but may be displayed in any other GUI form such as radio button, drop-down list, and list box.

Tool List Window

Referring to FIG. 5, the tool list window 310 includes a tool overview display window 311 and a machining process display window 312. The tool overview display window 311 displays: the tool information 158 of each tool Ta; the sum of the usage times for which the tools Ta have been used in the machining process; the sum of the volumes of the cut parts cut using the tools Ta in the machining process; and the largest value of the average values of the cutting power parameter in the machining process in which the tools Ta are used. The tool overview display window 311 may display information other than the above-described information. For example, the tool overview display window 311 may display the largest value of the peak values of the cutting power parameter in the machining process in which the tools Ta are used.

In an upper left corner portion of the tool list window 310, T numbers 313 are displayed. The T numbers 313 correspond to the respective tools Ta. On the right side of the T numbers 313, symbols 314 are displayed. The symbols 314 schematically show the respective tools Ta. The symbols 314 may be omitted. On the right side of the symbols 314, tool names 315 of the respective tools Ta are displayed. For some of the tools, such as a turning tool, a name 316 of a machined part is displayed on the right side of each tool name 315. On the right side of the tool names 315 (or the names 316, when there are names 316), numerical values 317 are displayed. Each numerical value 317 is a value of the size or nominal diameter of each tool Ta. A decimal point is added at the end of each numerical value 317, meaning that the part of the value on the left side of the decimal point is in mm units. In the example illustrated in FIGS. 4 and 5, size is displayed at the turning tool and the touch sensor (which are displayed in windows 311*b*, 311*d*, and 311*e*), and nominal diameter is displayed at the rest of the tools. Whether size or nominal diameter is displayed as the numerical value 317 depends on the kind of the tool.

Some tools Ta use different cutting edges to allow for different kinds of machining. In order to manage such cutting edges, it is possible to: identify the tool Ta using the integer part of the T number (or predetermined digits from the left); and specify a different end surface using the decimal point and the right side of the decimal point (or digits after the predetermined digits). A sign specifying such end surface will be referred to as suffix. Another possible example is to combine the numerical value of a T number and the suffix and use the combination to specify one tool Ta. In FIG. 5, suffixes 318 are displayed on the right side of the numerical values 317. While the suffixes 318 are in alphabetical notation, when the suffixes 318 are input into the program code as T numbers, ABC . . . Z are respectively converted into "01", "02", "03" . . . "26", or ABC . . . Z are respectively converted into "61", "62", "63" . . . "86".

In a lower half portion of the tool list window 310, bar charts are 319, 320, and 321 are displayed. In the bar chart 319, a maximum value is displayed that corresponds to the sum (maximum total usage time) of the usage times of the tool that is used for the longest time in the machining program 157. In the bar chart 320, a maximum value is displayed that corresponds to the sum (maximum total cutting volume) of the volumes of cut parts of the workpiece W1 cut by the tool is used to cut the largest volume of the workpiece W1 in the machining program 157. In the bar chart 321, a maximum value is displayed that corresponds to power ratio 200%, among the cutting power parameters. The bar length of the bar chart 319, the bar length of the bar chart 320, and the bar length of the bar chart 321 respectively correspond to: a ratio of the sum of the usage times of the tool Ta used in each machining process to the maximum total usage time; a ratio of the sum of the volumes of the cut part in each machining process in which the tool Ta is used to the maximum total cutting volume; and a ratio of the largest value of the average values of the cutting power parameter in the machining process in which the tool Ta is used to power ratio 200%. It is to be noted that as indicated by legend 403 in FIG. 16, it is possible to display, in the tool list window 310, a bar chart of a ratio of the largest value of the peak values of the cutting power parameter in the machining process in which each tool Ta is used to power ratio 200%.

In the example illustrated in FIG. 5, the usage time of the end mill is maximum, and thus it is at the end mill that the bar length of the bar chart 319 is at its maximum value. The bar length of the bar chart 319 in each tool of the other tools is determined based on a ratio of the total usage time of each tool to the total usage time of the end mill. Further, in the example illustrated in FIG. 5, the volume of the cut part that is cut by the face mill is maximum, and thus it is at the face mill that the bar length of the bar chart 320 is at its maximum value. The bar length of the bar chart 320 in each tool of the other tools is determined based on a ratio of the sum of the volumes of the cut part that is cut by each tool to the sum of the volumes of the cut part that is cut by the face mill. By displaying the bar charts 319 and 320, the user is able to be intuitively aware as to which tool Ta is largest in the usage time/cutting volume. Also, by displaying the bar chart 321, it becomes unnecessary for the user to refer to the machining process display window 312 in obtaining knowledge of, in the machining process associated with each tool Ta, relative magnitude of the load information in the bar charts.

In a upper right end portion of the tool overview display window 311, a machining process display/non-display interface 322 is displayed. For the tools in the tool overview display windows 311*a* and 311*c* to 311*e*, no machining process display window 312 is displayed. For these windows, machining process display interfaces 322a are displayed. The machining process display interface 322a is an interface for displaying the machining process display window 312. Upon manipulation of the machining process display interfaces 322a by way of an operation such as tapping and clicking, the machining process display window 312 of the tool corresponding to the tool overview display window 311 is displayed, as in the tool overview display window 311b.

For the tool of the tool overview display window 311b, the machining process display window 312 is displayed. For the window 311b, a machining process non-display interface 322b is displayed. The machining process non-display interface 322b is an interface for making the machining process display window 312 into non-display (hidden) state. Upon manipulation of the machining process non-display interface 322b by way of an operation such as tapping and clicking, the machining process display window 312 displayed disappears.

Above the tool list window 310, the machining process display interface 307 and the machining process non-display interface 308 are displayed. The machining process display interface 307 is an interface for the machining process display windows 312 of all tools. The machining process non-display interface 308 is an interface for making the machining process display windows 312 of all tools into non-display state. Upon manipulation of the machining process display interface 307 by way of an operation such as tapping and clicking, all the tools displayed in the tool list window 310 (all the tools used in the machining program 157) are displayed in the machining process display window 312. Upon manipulation of the machining process non-display interface 308 by way of an operation such as tapping and clicking, the machining process display windows 312 of all the tools displayed in the tool list window 310 (all the tools used in the machining program 157) disappear.

In FIGS. 4 and 5, the machining process display interfaces 307 and 322a are icons of pointing-down arrow heads, and the machining process non-display interfaces 308 and 322b are icons of pointing-up arrow heads. It is possible, however, that the machining process display interfaces 307 and 322a and the machining process non-display interfaces 308 and 322b are buttons displayed in the form of icons of any other pictorial symbols or text, or may be graphic user interfaces (GUI) such as radio button, drop-down list, and list box.

When one tool is used in a plurality of machining processes, a plurality of machining process display windows 312 are displayed according to the sorting criterion selected on the sorting criterion selection interface 305 in the machining process and in the order specified by the order specifying interface 306. In the example illustrated in FIG. 5, the usage time of tool Ta is selected as the criterion and decreasing order is specified. In this respect, the machining process display window 312a is a window for one machining process that is one of two machining processes in which the turning tool of T number 7 is used and that has a longer usage time. Accordingly, the machining process display window 312a is displayed at a position upper than the machining process display window 312b, which is a window for the other machining process having a shorter usage time.

In the machining process display window 312, a usage time 323 is displayed under the bar chart 319. The usage time 323 is the time for which the corresponding tool Ta is used in the machining process. Under the bar chart 321, a cutting power parameter 324 in the machining process is displayed. While in FIGS. 4 and 5 power ratio is displayed as the cutting power parameter, a conversion value of cutting power may be displayed. While no item is displayed under the bar chart 320, the volume of the cut part in the machining process may be displayed.

On the right side of the cutting power parameter 324, a spindle number 325 is displayed. The spindle number 325 indicates whether the workpiece W1 is held by the first spindle 122 or the second spindle 123. As the spindle number 325, a number (for example, "1") identifying the first spindle 122 or a number (for example, "2") identifying the second spindle 123 is displayed.

Figure 7:
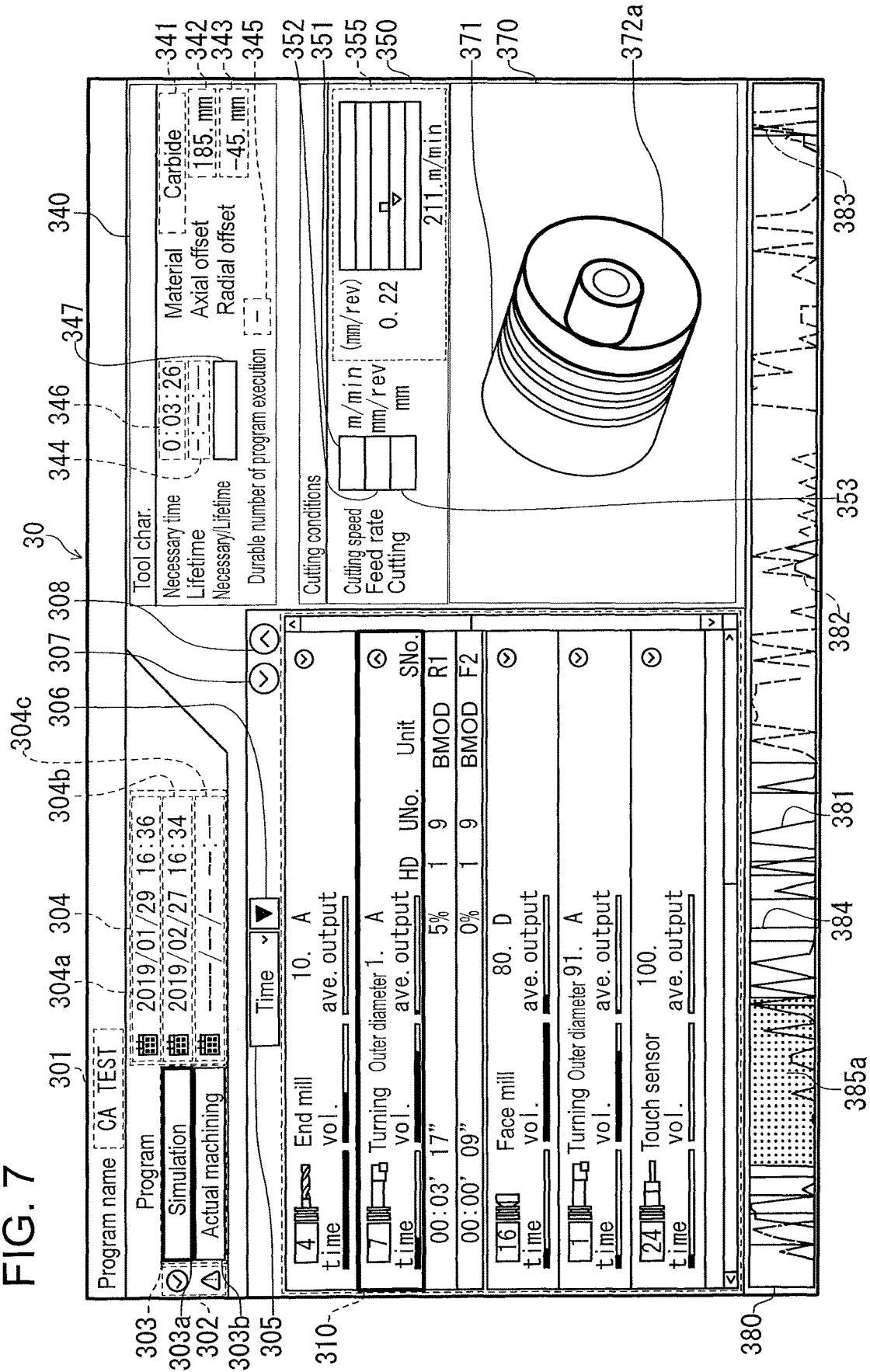
FIG. 7 illustrates another example display screen of the load display program according to the first embodiment.

On the right side of the spindle number 325, a unit number 326 is displayed. The unit number 326 is for identifying the machining process including the machining unit. On the right side of the unit number 326, information 327 is displayed. The information 327 is for identifying the machining content of the machining unit corresponding to the unit number 326. In FIGS. 4, 5, and 7, "BMOD" stands for "Bar Material Outer Diameter." On the right side of the information 327, the stage, 328, of the machining process is displayed. In FIG. 5, "R1" indicates that rough processing is performed and that the tool sequence number of the rough processing is 1; and "F2" indicates that finishing processing is performed and that the tool sequence number of the finishing processing is 2. In threading, pieces of information respectively indicating spotting, prepared hole processing, and tapping may be displayed in the stage 328.

In a right end portion of the tool list window 310, a scroll bar 329V is displayed. In a lower end portion of the tool list window 310, a scroll bar 329H is displayed. By moving the scroll bar 329V, the user is able to cause the tool overview display window 311 and the machining process display window 312 of a desired tool Ta to be displayed. By moving the scroll bar 329H, the user is able to cause other information of the machining process to be displayed in the machining process display window 312. The other information of the machining process may include, for example, coordinates of an approach point of the tool Ta at the start of the machining process.

Cooperation of Tool List Window and Other Windows

In the tool list window 310, either the tool overview display window 311 or the machining process display window 312 is selectable. Upon manipulation of the tool overview display window 311 by way of an operation such as tapping and clicking, the processor (210) (151) regards the manipulated tool overview display window 311 as the selected tool overview display window 311, and performs processing of highlighting this tool overview display window 311. In this embodiment, the tool Ta corresponding to the selected tool overview display window 311 will be referred to as selected tool. Then, upon selection of the selected tool displayed as one of the plurality of tools Ta, the processor (210) (151) performs processing of displaying a characteristic of the selected tool in the tool characteristics display window 340. Further, in a state in which no machining process in which the tool Ta corresponding to the selected tool overview display window 311 is used is selected, the processor (210) (151) performs processing of displaying, in the cutting conditions display window 350, cutting conditions common to the machining processes displayed in all the machining process display windows 312. It is to be noted that FIG. 7 illustrates an example of the display screen 30 in a state in which no machining process is selected. Next, the processor (210) (151) performs processing of displaying, in the cut part display window 370, the shape of a part that is machined in all the machining processes in which the selected tool is used. That is, upon selection of the selected tool displayed as one of the plurality of tools Ta, the processor (210) (151) performs processing of displaying the machined part of the workpiece W1 machined using the selected tool in all the machining processes in which the selected tool is used. Upon selection of the selected tool displayed as one of the plurality of tools, the processor (210) (151) performs processing of highlighting, in the tool load time-series graph 380, a period of time in which all the machining processes in which the selected tool is used are performed.

Upon manipulation of the machining process display window 312 by way of an operation such as tapping and clicking, the processor (210) (151) regards the manipulated machining process display window 312 as the selected machining process display window 312, and performs processing of highlighting the selected machining process display window 312. In this embodiment, the machining process corresponding to the selected machining process display window 312 will be referred to as selected machining process. Then, the processor (210) (151) performs processing of displaying, in the tool characteristics display window 340, a characteristic of the tool Ta used in the selected machining process. In this embodiment, the tool Ta used in the selected machining process will be referred to as in-use tool. Further, the processor (210) (151) performs processing of displaying cutting conditions for the selected machining process in the cutting conditions display window 350. That is, the processor (210) (151) performs processing of, upon selection of the selected machining process displayed as one of the at least one machining process, displaying at least one of the cutting depth, the feed rate, the cutting speed, and the rotational speed of the spindle in association with the selected machining process. More specifically, the processor (210) (151) performs processing of displaying, upon selection of the selected machining process displayed as one of the at least one machining process, the cutting depth, the feed rate, and the cutting speed associated with the selected machining process. The processor (210) (151) performs processing of displaying, in the cut part display window 370, the shape of the part machined in the selected machining process. That is, the processor (210) (151) performs processing of displaying, upon selection of the selected machining process displayed as one of the at least one machining process, the machined part of the workpiece W1 machined using the in-use tool used in the selected machining process. Upon selection of the selected machining process displayed as one of the at least one machining process, the processor (210) (151) performs processing of highlighting, in the tool load time-series graph 380, the period of time in which the selected machining process is performed. FIGS. 4 and 5 illustrate a state in which the machining process display window 312a is selected. Display contents of the tool characteristics display window 340, the cutting conditions display window 350, the cut part display window 370, and the tool load time-series graph 380 will be described in detail below.

Tool Characteristics Display Window

As described above, the tool characteristics display window 340 displays a characteristic of the tool Ta (selected tool) displayed in the selected tool overview display window 311 or a characteristic of the tool Ta (in-use tool) used in the machining process (selected machining process) corresponding to the selected machining process display window 312. The characteristic of the tool Ta includes at least one of the following stored in the tool information 158: the material of the tool Ta; the dimension of the tool Ta; the usage state (worn state) of the tool Ta; the lifetime of the tool Ta; and the tool Ta-durable number of program execution. That is, the processor (210) (151) performs processing of displaying, together with the characteristic of the selected tool, at least one of the lifetime of the selected tool and the durable number of execution of the machining program 157 in which the selected tool is used. Alternatively, the processor 210 (151) performs processing of displaying, together with the characteristic of the in-use tool, at least one of the lifetime of the in-use tool and the durable number of execution of the machining program 157 in which the in-use tool is used. In FIG. 4, the tool characteristics display window 340 is displaying: the material, 341, of the tool Ta; the axial offset, 342, of the tool Ta; the radial offset, 343, of the tool Ta; the lifetime, 344, of the tool Ta; and the tool Ta-durable number of program execution, 345. In the tool characteristics display window 340, however, some of these pieces of information 341 to 345 may be omitted, or a characteristic of another tool Ta may be displayed. In FIG. 4, the tool characteristics display window 340 is displaying the material, axial offset, and radial offset of the turning tool of T number 7. Since no lifetime and durable number of program execution are set for the turning tool, the lifetime 344 and the durable number of program execution 345 are indicated by dashes.

The tool characteristics display window 340 displays, as necessary time 346, the sum of the usage times for which the tool Ta has been used per execution of the machining program 157. Referring to FIG. 5, the usage time of the tool Ta used in the machining process corresponding to the machining process display window 312a is 3 minutes and 17 seconds; and the usage time of the tool Ta used in the machining process corresponding to the machining process display window 312b is 9 seconds. Therefore, the necessary time 346 displayed in the tool characteristics display window 340 in FIG. 4 is 3 minutes and 26 seconds. When the tool Ta has a lifetime set, the tool characteristics display window 340 may display a ratio 347 of the necessary time 346 to lifetime 344. This enables the user to know a standard indicating how many times the tool Ta is usable in the machining program 157.

Cutting Conditions Display Window

As described above, in a state in which no machining process in which the selected tool is used is selected, the cutting conditions display window 350 displays cutting conditions common to the machining processes displayed in all the machining process display windows 312 corresponding to the selected tool. When the machining process display window 312 is selected, the cutting conditions display window 350 displays cutting conditions for the selected machining process. In FIG. 4, the cutting conditions display window 350 is displaying cutting speed 351, feed per revolution 352, and cutting depth 353. That is, upon selection of the selected machining process displayed as one of the at least one machining process, the processor (210) (151) performs processing of displaying at least one of the following that correspond to the selected machining process: the cutting depth 353; the feed rate 352; the cutting speed 351; and the rotational speed of the spindle. In the cutting conditions display window 350, however, some of these pieces of information 351 to 353 may be omitted or other cutting conditions may be displayed. In FIG. 4, the cutting conditions display window 350 is displaying cutting conditions for the machining process corresponding to the machining process display window 312a. In FIG. 7, for the turning tool of T number 7, which is the selected tool, the cutting speed 351, the feed per revolution 352, the cutting depth 353 are common to rough processing and finishing processing. Each of these pieces of information is common in terms of a parameter and, as such, displayed in the window. However, each information has different values and therefore are not displayed on the display screen 30.

Referring to FIG. 4, the cutting conditions display window 350 displays a contrast graph 355. The contrast graph 355 is a graph that displays: the cutting speeds 351 and the feed per revolutions 352 respectively corresponding to all the machining processes in which the selected tool is used when the tool overview display window 311 is selected; and the cutting speeds 351 and the feed per revolutions 352 respectively corresponding to all the machining processes in which the in-use tool is used when the machining process display window 312 is selected. When the machining process display window 312 is selected, the contrast graph 355 displays: the cutting speed and the feed rate corresponding to the selected machining process; and the cutting speed and the feed rate corresponding to a machining process different from the selected machining process in which the in-use tool is used. The contrast graph 355 displays the cutting speeds and the feed rates in such a form that the cutting speeds are comparable with each other and the feed rates comparable with each other. That is, the processor (210) (151) performs processing of displaying the cutting speed and the feed rate corresponding to the selected machining process and the cutting speed and the feed rate corresponding to a different machining process different from the selected machining process in which each tool is used wherein the cutting speeds and the feed rates are displayed in such a form that the cutting speeds are comparable with each other and the feed rates are comparable with each other. The horizontal axis of the contrast graph 355 is the cutting speed 351, and the vertical axis of the contrast graph 355 is the feed per revolution 352. In the contrast graph, cutting conditions for the machining process of rough processing are indicated by a quadrangle, and cutting conditions for the machining process of finishing processing are indicated by a triangle. As used herein, the phrase "in such a form that the cutting speeds are comparable with each other and the feed rates are comparable with each other" is intended to mean enlarging graphical representations of the cutting speed and the feed rate corresponding to the selected machining process or displaying the graphical representations in different colors. FIG. 4 illustrates an example in which graphical representations of the cutting conditions for the selected machining process are enlarged. It is to be noted that as illustrated in FIG. 7, in a state in which no machining process in which the selected tool is used is selected, graphical representations of the cutting conditions for all the machining processes are displayed in an identical form. That is, graphical representations of the cutting conditions for all the machining processes in which the selected tool is used are displayed without changes in size and color, as opposed to the above-described configuration. The contrast graph 355 is displaying numerical values of the maximum value of the cutting speed 351 displayed and the maximum value of the feed per revolution 352 displayed. This enables the user to easily compare another machining process associated with the in-use tool with the selected machining process.

Cut Part Display Window

The cut part display window 370 displays: a final product shape 371, which is obtained as a result of the machining program 157; and the shape of the part that is machined in all the machining processes in which the selected tool is used or the shape of the part machined in the selected machining process. That is, the cut part display window 370 displays: the machined part of the workpiece W1 machined using the selected tool; or the machined part of the workpiece W1 machined using the in-use tool in the selected machining process. In FIG. 4, the machined part of the workpiece W1 machined using the selected tool is indicated by a bold line with legend 372. In FIG. 7, the machined part of the workpiece W1 machined using the selected tool is indicated by a bold line with legend 372*a*. Such parts are subject to change in line boldness and/or color. The processor (210) (151) may obtain the final product shape 371 by obtaining the shape of the pre-machined workpiece W1 from the common unit and obtaining machined shapes from the shape sequences of all the machining units. Also, the processor (210) (151) may obtain the machined shape to be displayed from the shape sequence of the machining unit in which all the machining processes in which the selected tool is used are included or from the shape sequence the machining unit in which the selected machining process is included.

Tool Load Time-Series Graph

The tool load time-series graph 380 is a graph that shows a cutting power parameter of the tool in a time-series manner from the start to the end of execution of the machining program 157. That is, the processor (210) (151) displays a graph that shows, in a time-series manner from the start to the end of the machining program 157, a cutting power parameter corresponding to the cutting power applied to each tool. In this example, the tool load time-series graph 380 displays changes in the power ratio. The tool load time-series graph 380, however, may be a graph that shows the conversion value of the cutting power in a time-series manner. In the tool load time-series graph 380, solid line 381 indicates the cutting power parameter in a case where the workpiece W1 is mounted on the first spindle 122. Dotted line 382 indicates the cutting power parameter in a case where the tool spindle 114 is rotated. Single-dashed line 383 indicates the cutting power parameter in a case where the workpiece W1 is mounted on the second spindle 123. In the tool load time-series graph 380, vertical line 384 indicates a time point of switch to another machining process. In the tool load time-series graph 380, an highlighted area 385 indicates a period of time in which all machining processes in which the selected tool is used are performed, or indicates a period of time in which the selected machining process is performed. In FIG. 4, the highlighted area 385 corresponds to a period of time in which the machining process corresponding to the machining process display window 312*a* is performed. As illustrated in FIG. 7, when the tool overview display window 311 is selected and there are a plurality of machining processes in which the selected tool is used, a period of time 385*a*, in which all the plurality of machining processes are performed, is highlighted.

Flow of Processing of Display Screen Generation

Figure 8:
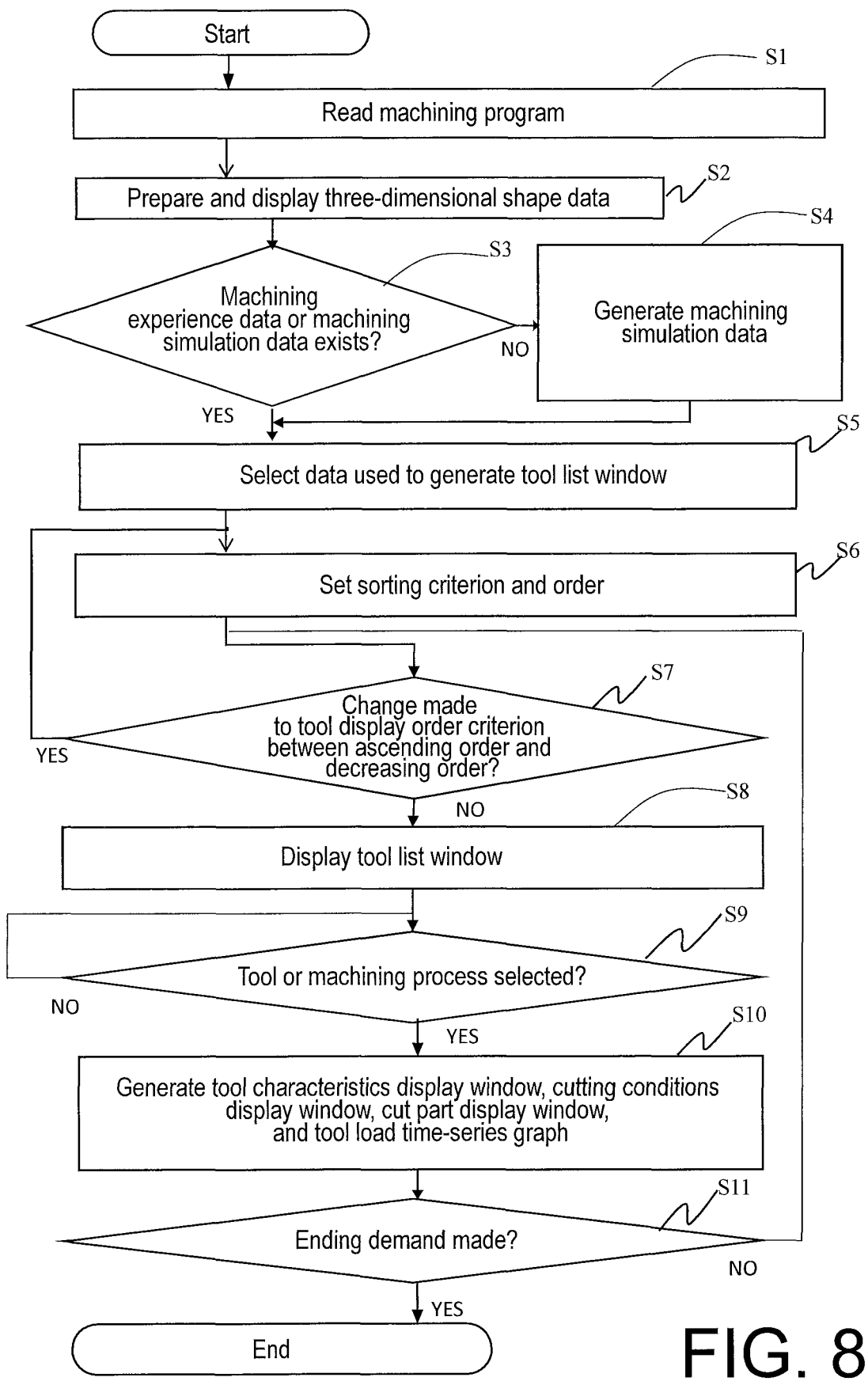
FIG. 8 is a flowchart of processing of generating a display screen in a load display method and the load display program.

FIG. 8 is a flowchart of processing of generating the display screen 30 in the load display method according to this embodiment and the load display program 221 (156). First, the processor (210) (151) reads the machining program 157 specified by the user at the start time of execution of the load display program 221 (156) (step S1). That is, the processor (210) (151) inputs a plurality of tools Ta used during machining work and the machining program 157, which specifies at least one machining process performed by using each of the plurality of tools in the machining work. The processor (210) (151) performs processing of: analyzing the shape sequences of the common unit and the machining units in the machining program 157; preparing three-dimensional shape data of the final product; and displaying the data in the cut part display window 370 (step S2). Next, the processor (210) (151) checks whether the machining experience data 163 or the machining simulation data 164 exists (step S3). When neither data exists (No at step S3), the processor (210) (151) executes a simulator to generate the machining simulation data 164 (step S4). That is, the processor (210) (151) calculates at least one piece of load information for each tool based on the machining program 157. When the result at step S3 is Yes or after performing step S4, the processor (210) (151) displays the data status indicator 302 and receives an input from the data selector 303. The processor (210) (151) selects, from the machining experience data 163 and the machining simulation data 164, data used to generate the tool list window 310 based on the input from the data selector 303 (step S5).

Upon selection of the data at step S5, the processor (210) (151) sets a sorting criterion based on a default value of the sorting criterion selection interface 305 and a default value of the order specifying interface 306. The sorting criterion is set from the usage time of tool Ta, the volume of the cut part that is cut by the tool Ta, the path length of the tool Ta for cutting work, the average value of the cutting power parameter, the peak value of the cutting power parameter, and the cutting work order. Then, the processor (210) (151) sets an order, which is ascending order or decreasing order (step S6). Upon receipt of an input the sorting criterion selection interface 305 and/or the order specifying interface 306 (Yes at step S7), the processor (210) (151) re-sets the sorting criterion and the order based on the input (step S6). When there is no input from the sorting criterion selection interface 305 and the order specifying interface 306 (No at step S7), the procedure proceeds to step S8.

At step S8, the processor (210) (151) performs processing of displaying the tool list window 310 based on the sorting criterion and the order set at step S6. That is, the processor (210) (151) performs processing of displaying the plurality of tools in turn on the display 240 (154) based on the value of the selected load information, which is one of the at least one piece of load information. Although only the tool overview display window 311 is displayed in the tool list window 310 immediately after activation of the load display program 221 (156), the machining process display window 312 is displayed by manipulating the machining process display interfaces 307 and 322a. That is, the processor (210) (151) performs processing of displaying, on the display 240 (154) and next to each of the plurality of tools Ta, at least one machining process performed using each of the plurality of tools.

Next, the processor (210) (151) receives a manipulation such as clicking and tapping on the tool overview display window 311 or the machining process display window 312 (step S9). The processor (210) (151) regards the manipulated tool overview display window 311 or the manipulated machining process display window 312 as the selected tool overview display window 311 or the selected machining process display window 312. The processor (210) (151) regards the tool Ta corresponding to the selected tool overview display window 311 as the selected tool. The processor (210) (151) treats the machining process corresponding to the selected machining process display window 312 as the selected machining process.

When no manipulation has been made at step S9 (No at step S9), the processor (210) (151) waits without displaying anything in the tool characteristics display window 340, the cutting conditions display window 350, the cut part display window 370, and the tool load time-series graph 380. When a manipulation has been made (Yes at step S9), the processor (210) (151) performs processing of displaying the tool characteristics display window 340 associated with the selected tool or the in-use tool used in the selected machining process. Then, upon manipulation of the tool overview display window 311, the processor (210) (151) performs processing of displaying, in the cutting conditions display window 350, the cutting conditions common to all the machining processes associated with the selected tool. Upon manipulation of the machining process display window 312, the processor (210) (151) performs processing of displaying the cutting conditions display window 350 associated with the selected machining process. Further, upon manipulation of the tool overview display window 311, the processor (210) (151) performs processing of: displaying, in the cut part display window 370, the shape of the part machined in all the machining processes in which the selected tool is used; and highlighting, in the tool load time-series graph 380, the time for which all the machining processes are performed. Upon manipulation of the machining process display window 312, the processor (210) (151) performs processing of: displaying, in the cut part display window 370, the shape of the part machined in the selected machining process; and highlighting, in the tool load time-series graph 380, the time for which the selected machining process is performed (a series of these processings are performed at step S10).

Next, the processor (210) (151) waits for a program ending demand (step S11). As used herein, the term "program ending demand" is intended to mean an ending event in which the load display program 221 (156) ends. When there is no program ending demand (No at step S11), the procedure returns to step S7. When there is a program ending demand (Yes at step S11), the load display program 221 (156) ends.

Cooperation of Tool Load Time-Series Graph and Other Windows

Figure 9:
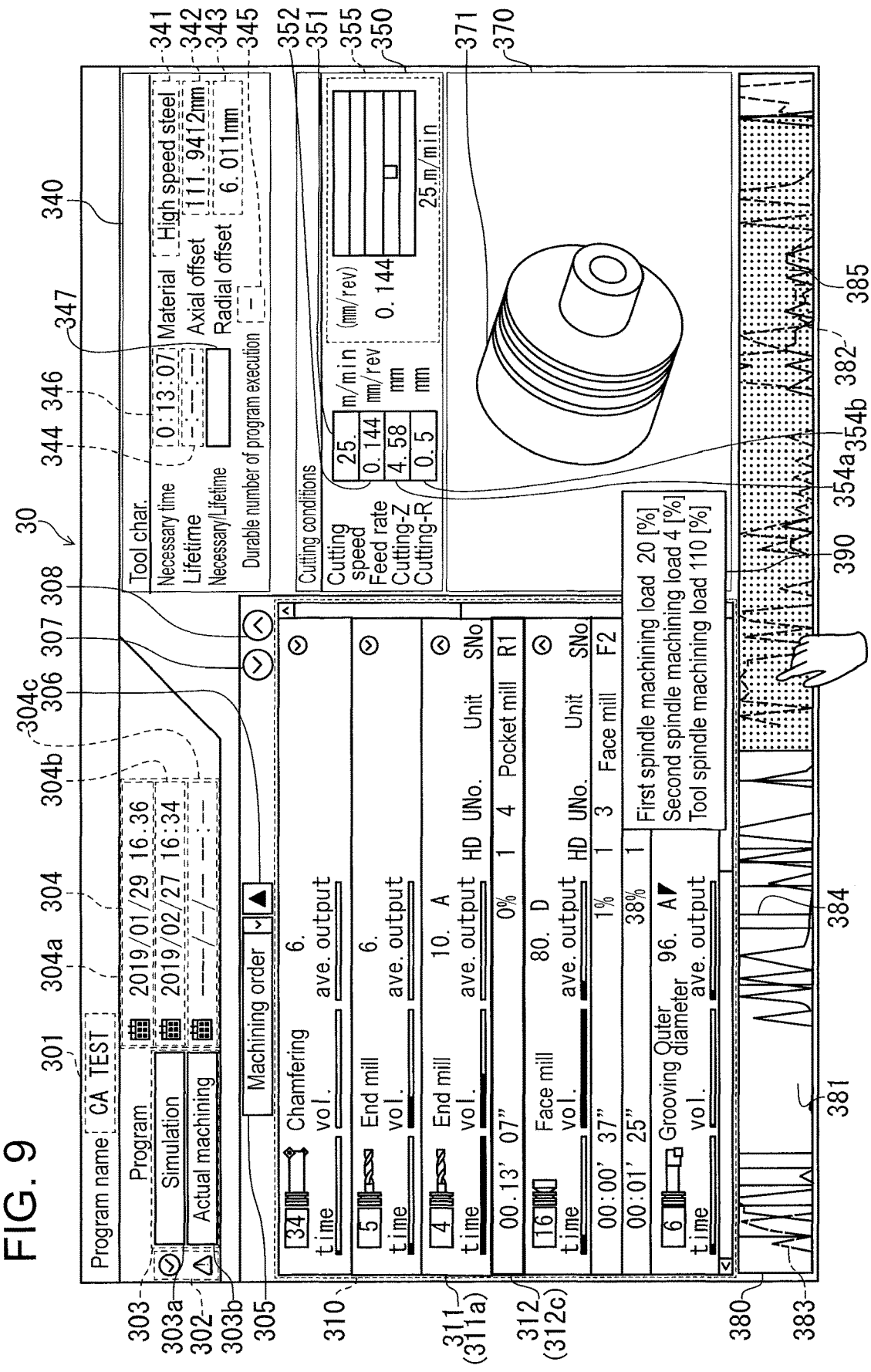
FIG. 9 illustrates how a tool load time-series graph cooperates with other windows.

In the above-described embodiment, a cooperation between the tool list window 310 and other windows 340, 350, 370, and 380 has been described. It is also possible for the tool load time-series graph 380 to cooperate other windows 310, 340, 350, and 370. A method for this cooperation will be described below. As described earlier, the vertical line 384 of the tool load time-series graph 380 indicates a time point of switch between a machining process and a machining process. The processor (210) (151) manages a sectional area between a vertical line 384 and a vertical line 384 in relation to a machining process. The sectional area corresponds to the period of time in which the related machining process is performed. That is, in the tool load time-series graph 380, the processor (210) (151) manages at least one period of time in which at least one machining process is performed. As illustrated in FIG. 9, upon manipulation of the sectional area by way of an operation such as tapping and clicking, the processor (210) (151) performs processing of: highlighting, in the tool list window 310, the machining process corresponding to the sectional area; displaying, in the tool characteristics display window 340, a tool characteristic of the tool Ta used in the machining process; displaying cutting conditions for the machining process in the cutting conditions display window 350; and displaying, in the cut part display window 370, the shape of the part machined in the machining process.

Figure 10:
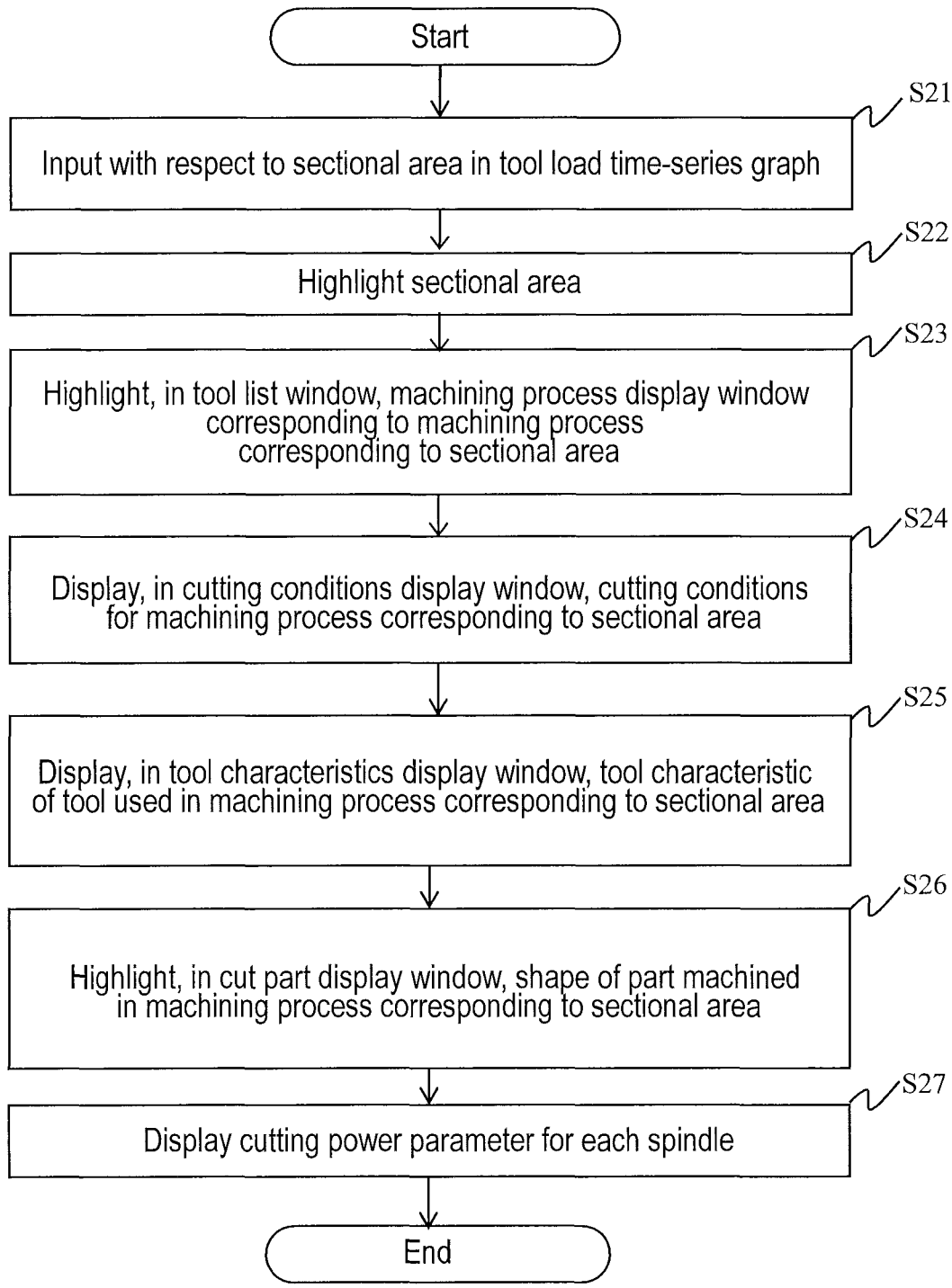
FIG. 10 is a flowchart of cooperation processing starting from the tool load time-series graph in the load display method and the load display program.

A prerequisite of this cooperation processing is that in displaying the tool load time-series graph 380 at step S10 of FIG. 8, the processor (210) (151) correlates the sectional area and the machining process and stores resulting correlation data in the memory 220 (152). When the tool load time-series graph 380 can be enlarged and reduced in size by manipulations such as pinching to zoom out, pinching to zoom in, and mouse wheeling, the processor (210) (151)

correlates the sectional area with the machining process in accordance with the enlargement and/or reduction in size of the tool load time-series graph 380, and stores resulting correlation data in the memory 220 (152). FIG. 10 is a flowchart of cooperation processing performed after the correlation and performed in the load display method according to this embodiment and the load display program 221 (156). First, the processor (210) (151) receives an input manipulation such as clicking and tapping made with respect to the sectional area in the tool load time-series graph 380 (step S21). Then, the processor (210) (151) highlights the sectional area in the tool load time-series graph 380 (step S22). This highlighted area corresponds to the highlighted sectional area 385 in FIG. 9. In this embodiment, the period of time corresponding to the highlighted sectional area 385 will be referred to as selected period of time.

Next, the processor (210) (151) refers to the correlation data to obtain the machining process corresponding to the sectional area 385. Then, the processor (210) (151) performs processing of highlighting, in the tool list window 310, the machining process display window 312 corresponding to the machining process corresponding to the sectional area 385 (step S23). That is, upon selection of the selected period of time as one of the at least one period of time, the processor (210) (151) performs processing of highlighting the machining process corresponding to the selected period of time. Then, the processor (210) (151) performs processing of displaying, in the cutting conditions display window 350, cutting conditions for the machining process corresponding to the sectional area 385 (step S24). More specifically, the processor (210) (151) performs processing of displaying the cutting depth, the feed rate, and the cutting speed associated with the machining process corresponding to the selected period of time. The example illustrated in FIG. 9 is different from the example illustrated in FIG. 4 in that: the machining process corresponding to the sectional area 385 is rough processing performed using the end mill of T number 4; the machining process display window 312c corresponding to the machining process is highlighted; and cutting conditions for the machining process are displayed in the cutting conditions display window 350. In FIG. 9, since the selected machining process is milling, the cutting depth 354 in the Z axis direction and the cutting depth 354 in the tool radial direction are displayed in the cutting conditions display window 350.

Further, the processor (210) (151) performs processing of displaying, in the tool characteristics display window 340, a tool characteristic of the tool used in the machining process corresponding to the sectional area 385 (step S25). That is, the processor (210) (151) performs processing of displaying a characteristic of the tool used in the machining process corresponding to the selected period of time. The example illustrated in FIG. 9 is different from the example illustrated in FIG. 4 in that a tool characteristic of the end mill of T number 4 is displayed in the tool characteristics display window 340. The processor (210) (151) performs processing of displaying, in the cut part display window 370, the shape of the part machined in the machining process corresponding to the sectional area 385 (step S26). That is, the processor (210) (151) performs processing of displaying the machined part of the workpiece machined in the machining process corresponding to the selected period of time and machined using the in-use tool used in the machining process corresponding to the selected period of time. The example illustrated in FIG. 9 is different from the example illustrated in FIG. 4 in that the shape of the part machined in the machining process is situated on the back side of the object displayed as the final product shape 371 in the cut part display window 370, and, therefore, the machined part (indicated by the legend 372 in FIG. 4) is not displayed.

Lastly, the processor (210) (151) performs processing of displaying a pop-up window 390 over the sectional area 385 and displaying a cutting power parameter for each spindle in the pop-up window 390 (step S27). In FIG. 9, an average value of the power ratio is displayed as the cutting power parameter. FIG. 9 also illustrates an example of pocket milling in which cutting power occurs by rotating the tool spindle 114. In this case, since the tool spindle 114 is rotated, the cutting power parameter indicated by the dotted line 382 is large. Further, in the machining process of pocket milling, the workpiece W1 is mounted on the first spindle 122 first, and at last, the workpiece W1 is relocated to the second spindle 123. In order to maintain the posture of the workpiece W1 in pocket milling, the motor rotating the first spindle 122 is making an output while the workpiece W1 is mounted on the first spindle 122, and the motor rotating the second spindle 123 is making an output while the workpiece W1 is mounted on the second spindle 123. Thus, in the machining process of pocket milling, a cutting power parameter occurs not only in the tool spindle 114 but also in the first spindle 122 and the second spindle 123. Under the circumstances, cutting power parameters associated with all the spindles are displayed in the pop-up window 390.

Changing of Cutting Conditions

Figure 11:
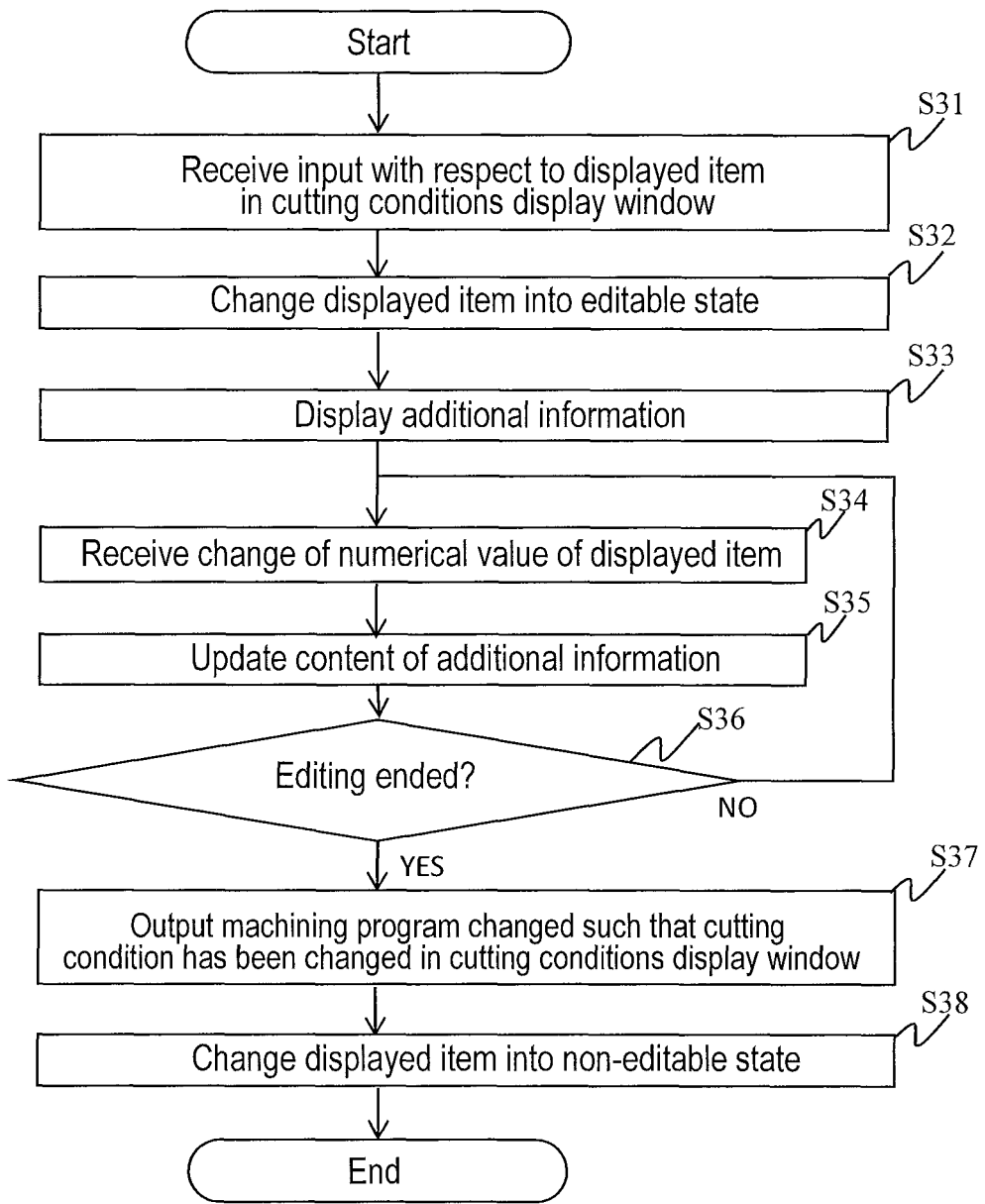
FIG. 11 is a flowchart of processing of changing a cutting condition in the load display method according to the first embodiment and in the load display program.

The load display program 221 (156) may change, using the cutting conditions display window 350, the cutting conditions for the machining process set in the machining program 157. For example, by shortening the period of machining time of a machining process having a long period of machining time, the period of machining time of a product can be shortened. For further example, when a tool Ta receives so high a load that the tool lifetime is shortened, it is possible to change cutting conditions to make the lifetime of the tool Ta longer. FIG. 11 is a flowchart of processing of changing a cutting condition in the load display method according to this embodiment and the load display program 221 (156).

Figure 12:
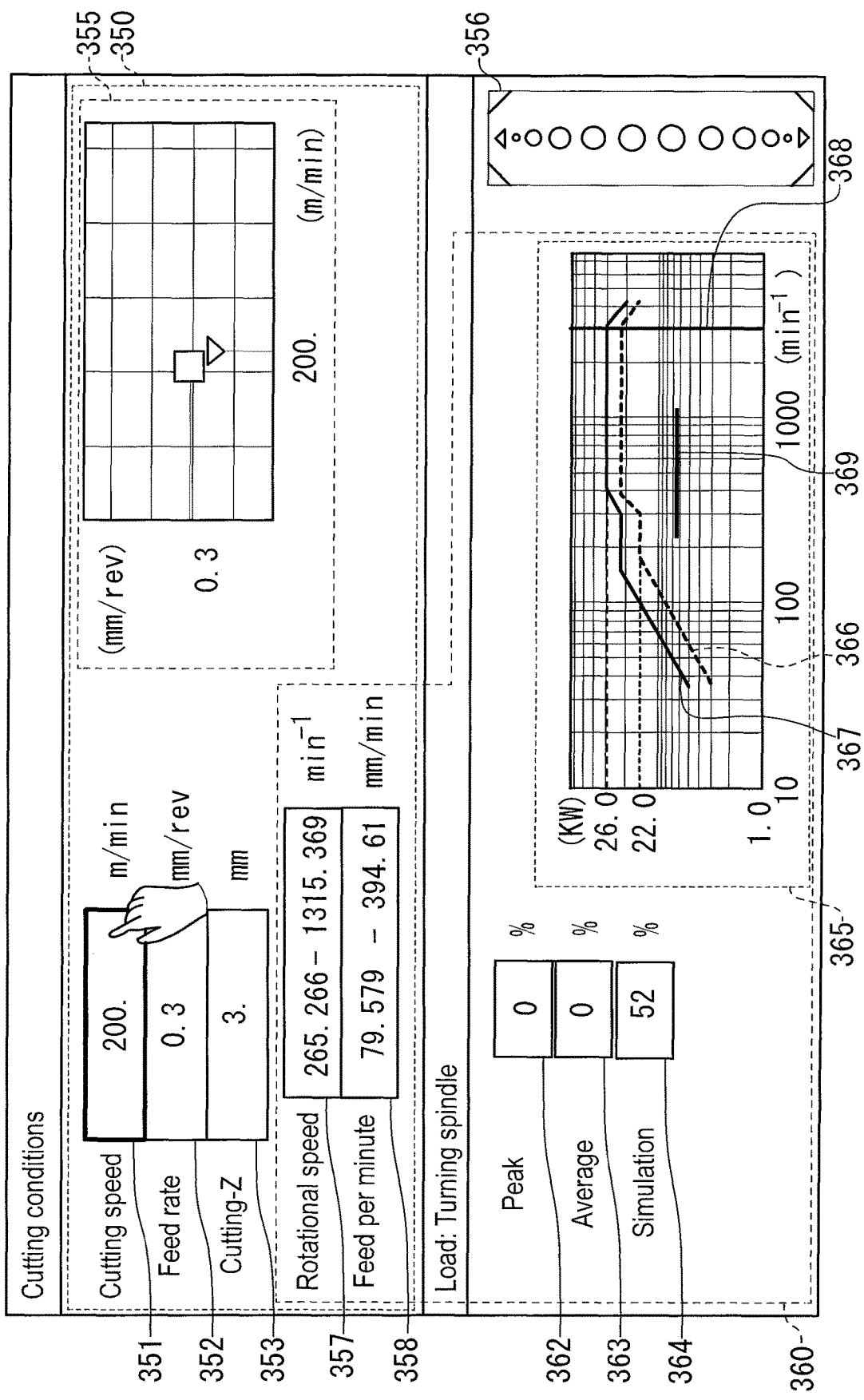
FIG. 12 illustrates an example window displayed in changing of the cutting condition in the first embodiment.

The processor (210) (151) receives an input manipulation such as clicking and tapping on one displayed item among displayed items 351 to 353 displayed in the cutting conditions display window 350 (step S31). While FIG. 12 illustrates an example in which the form of the cutting speed 351 is tapped, the form of the cutting speed 351 may be clicked on using a pointing device such as a mouse.

Upon receipt of an input manipulation, the processor (210) (151) changes the one displayed item into editable state (step S32). FIG. 12 illustrates an example in which as a result of a tapping of the form of the cutting speed 351, the form is activated and an imaginary mouse wheel 356 (mouse wheel 356 generated by computer graphics (CG)) is displayed on the display screen 30. By moving the imaginary mouse wheel 356 by swiping or drugging using a mouse, the user is able to change the cutting speed 351. This also applies in cases where the feed per revolution 352 or the cutting depth 353 is tapped. It is to be noted, however, that the example illustrated in FIG. 12 is provided for exemplary purposes only; another possible example is that by activating the form, a numerical value may be input in the form via the input interface 250, which is an input device such as a keyboard. Another possible example is that the processor (210) (151) may: display, on the display 240 (154), an imaginary keyboard and/or an imaginary numeric keyboard (a keyboard and/or a numeric keyboard generated by CG);

and make an input into the imaginary keyboard and/or the imaginary numeric keyboard to rewrite the numerical value in the activated form.

Further, the processor (210) (151) performs processing of displaying additional information 360 on the display screen 30 (step S33). The additional information 360 is information that is referred to when the cutting conditions are changed. Specifically, the additional information 360 shows spindle rotational speed 357 and feed per minute 358. As described above, the cutting speed is proportional to a value obtained by multiplying the spindle rotational speed by the workpiece diameter. Therefore, assuming that the cutting speed is constant, if the workpiece diameter is changed by cutting, the spindle rotational speed also changes in response to the change in the workpiece diameter. Also, the feed per minute is a value obtained by multiplying the feed rate 352 by this spindle rotational speed. Thus, the spindle rotational speed and the feed per minute are subject to change in one machining process. Under the circumstances, the additional information 360 shows a possible range 357 of the spindle rotational speed and a possible range 358 of the feed per minute, which are calculated from the changed cutting condition (the cutting speed 351 in the example illustrated in FIG. 12). It is possible, however, to omit the possible range 357 of the spindle rotational speed and the possible range 358 of the feed per minute. The additional information 360 further shows cutting power parameters 362 to 364. That is, referring to FIG. 12, upon selection of the selected machining process from at least one machining process displayed, the display 240 (154) displays the load information and a cutting parameter value in the selected machining process. In FIG. 12, a peak value 362 indicates the peak value of the power ratio in the selected machining process among the power ratio values read from the machining experience data 163. The average value 363 indicates the average value of the power ratio in the selected machining process among the power ratio values read from the machining experience data 163. In the example illustrated in FIG. 12, there is no machining experience data 163, and, therefore, both the peak value 362 and the average value 363 are 0. The simulation value 364 is the average value of power ratio estimated values in the selected machining process. The power ratio estimated values are obtained by: obtaining the cutting power by solving the equations illustrated in FIG. 6 from the cutting condition changed by the user (the cutting speed 351 in the example illustrated in FIG. 12); and obtaining the continuous rated output of the motor that rotates the spindle from the range 357 of the spindle rotational speed. It is to be noted that the peak value 362 and the average value 363 may respectively be the peak value and the average value of cutting power values in the selected machining process among the cutting power values read from the machining experience data 163, or may respectively be the peak value and the average value of estimated values in the selected machining process among estimated values of cutting power values calculated from the above-described power ratio. It is also to be noted that the simulation value 364 may not necessarily be a value obtained by calculating the power ratio but may be an estimated value of the cutting power derived from the equations illustrated in FIG. 6. By displaying the simulation value 364 along with the peak value 362 and the average value 363, which are actually measured values, the user is able to obtain knowledge of an effect of changing a cutting condition.

In FIG. 12, the additional information 360 further shows a power line graph 365 of the motor that applies cutting power to the tool Ta. The horizontal axis of the power line graph 365 denotes the rotational speed of the motor, and the vertical axis of the power line graph 365 denotes the output power of the motor. The power line graph 365 shows continuous rated output 366 of the motor, short-time rated output 367 of the motor, and predetermined upper-limit rotational speed 368 of the motor. As seen from the power line graph 365, the continuous rated output 366 and the short-time rated output 367 of the motor depend on the rotational speed. In the power line graph 365, a line segment 369 indicates, within the possible range 357 of the spindle rotational speed, estimated values of the cutting power calculated based on the equations illustrated in FIG. 6 from the values of the displayed items 351 to 353 displayed in the cutting conditions display window 350, the tool information 158, the material information 161, and the machine constant data 162. It is to be noted that the ratio between the power indicated by the line segment 369 and the continuous rated output 366 corresponds to the power ratio.

Next, a command to change into a correction value the value of at least one parameter of the cutting parameters displayed is input via the interface 250 (154). Then, the processor (210) (151) receives a change of the numerical value of one displayed item, among the displayed items 351 to 353, that is in editable state (step S34). Specifically, the processor (210) (151) receives: an input of a swiping or a mouse drugging of the imaginary mouse wheel 356; an input from the input interface 250, which is an input device such as a keyboard; and/or an input from the imaginary keyboard and/or the imaginary numeric keyboard displayed on the display 240 (154). It is to be noted that even if the cutting speed 351 is changed by a swiping of the imaginary mouse wheel 356, the change in the cutting speed 351 may be restricted so that the spindle rotational speed does not exceed the upper-limit rotational speed 368. This also applies in cases where the cutting speed 351 is changed using an interface other than the imaginary mouse wheel 356. For example, assume that such a cutting speed 351 has been input from the input interface 250, which is an input device such as a keyboard, that the maximum value of the spindle rotational speed exceeds the upper-limit rotational speed 368. In this case, the cutting speed 351 may be automatically corrected so that the maximum value of the spindle rotational speed becomes the upper-limit rotational speed 368. Upon receipt of a change in a numerical value, the processor (210) (151) performs processing of changing into a correction value the value of at least one parameter of the displayed cutting parameters (the displayed item 351 to 354).

Further, by the methods described in the context of step S33, the processor (210) (151) calculates the possible range 357 of the spindle rotational speed, the possible range 358 of the feed per minute, and the cutting power parameters (average power ratios) 362 to 364, and updates the content of the additional information 360 (step S35). In the update processing, the processor (210) (151) not only changes the numerical values of the displayed items 357, 358, and 362 to 364, but also updates the position and length of the line segment 369 based on the updated possible range 357 of the spindle rotational speed and a conversion value of the cutting power. By the processing described thus far, the processor (210) (151) re-calculates the load information based on the correction value. The display 240 (154) displays the re-calculated load information.

Next, the processor (210) (151) determines whether there is an event associated with edition ending (step S36). Examples of the event associated with edition ending include: an input manipulation such as clicking and tapping on the one displayed item that has been kept in editable state; and an manipulation of a predetermined button provided inside or outside the display screen 30. When there is no event associated with edition ending (No at step S36), the procedure returns to step S34. When there is an event associated with edition ending (Yes at step S36), the processor (210) (151) outputs the machining program 157 changed such that the cutting condition has been changed in the cutting conditions display window 350 (step S37). That is, upon input of a change command (event associated with edition ending) to reflect the change in at least one parameter in the selected machining process in the machining program 157, the processor (210) (151) outputs a first correction machining program, in which the value of the at least one parameter in the machining program 157 is changed into the correction value. Then, the processor (210) (151) changes, into non-editable state, the displayed item that has been kept in editable state (step S38). Specifically, the processor (210) (151) deactivates the form of the displayed item that has been kept in editable state, causing the displayed imaginary mouse wheel 356 and the displayed imaginary keyboard and/or imaginary numeric keyboard to disappear.

Tool Replacement

Figure 13A:
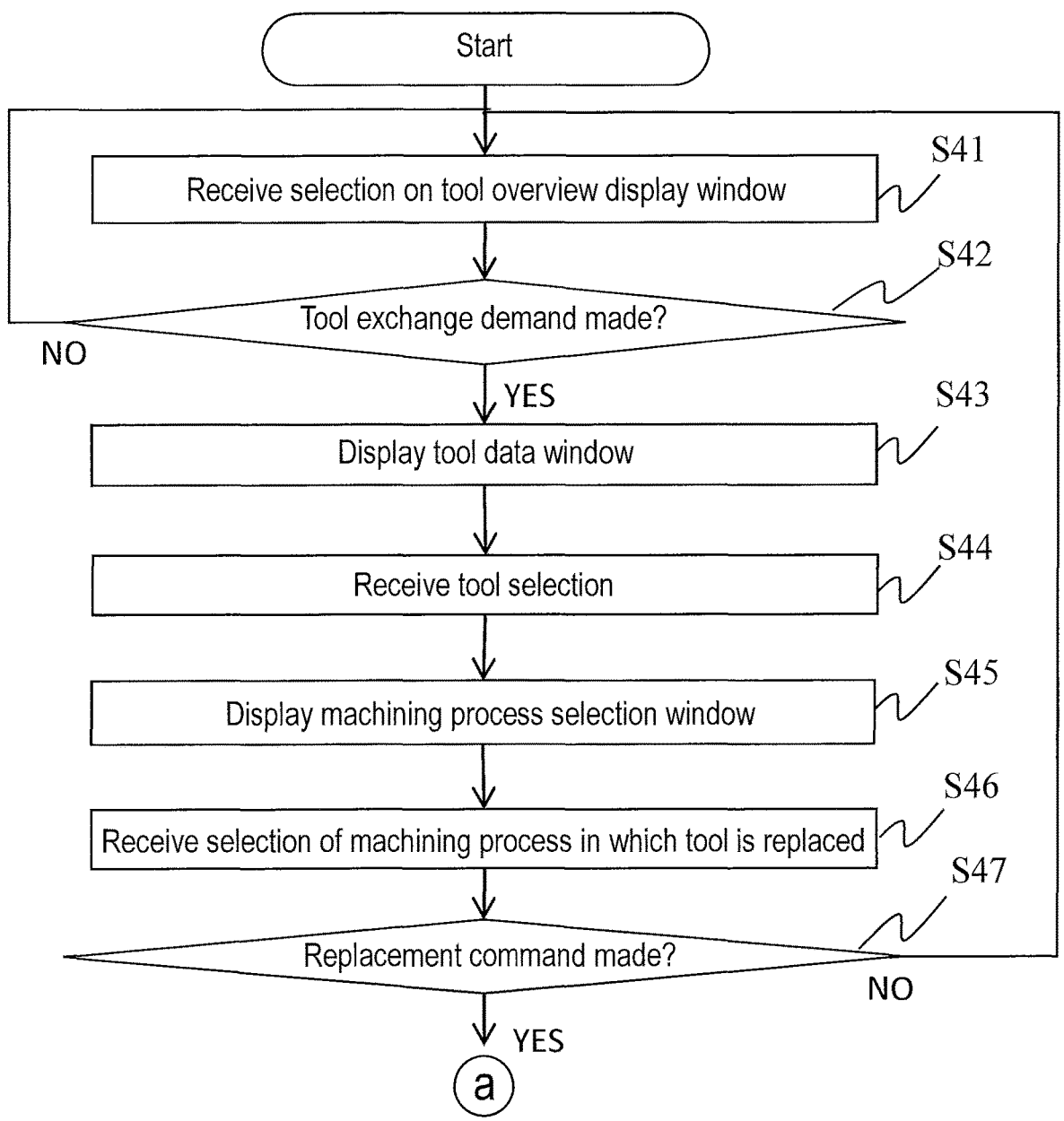
FIGS. 13A and 13B are flowcharts of tool exchanging processing in the load display method according to the first embodiment and in the load display program.
Figure 13B:
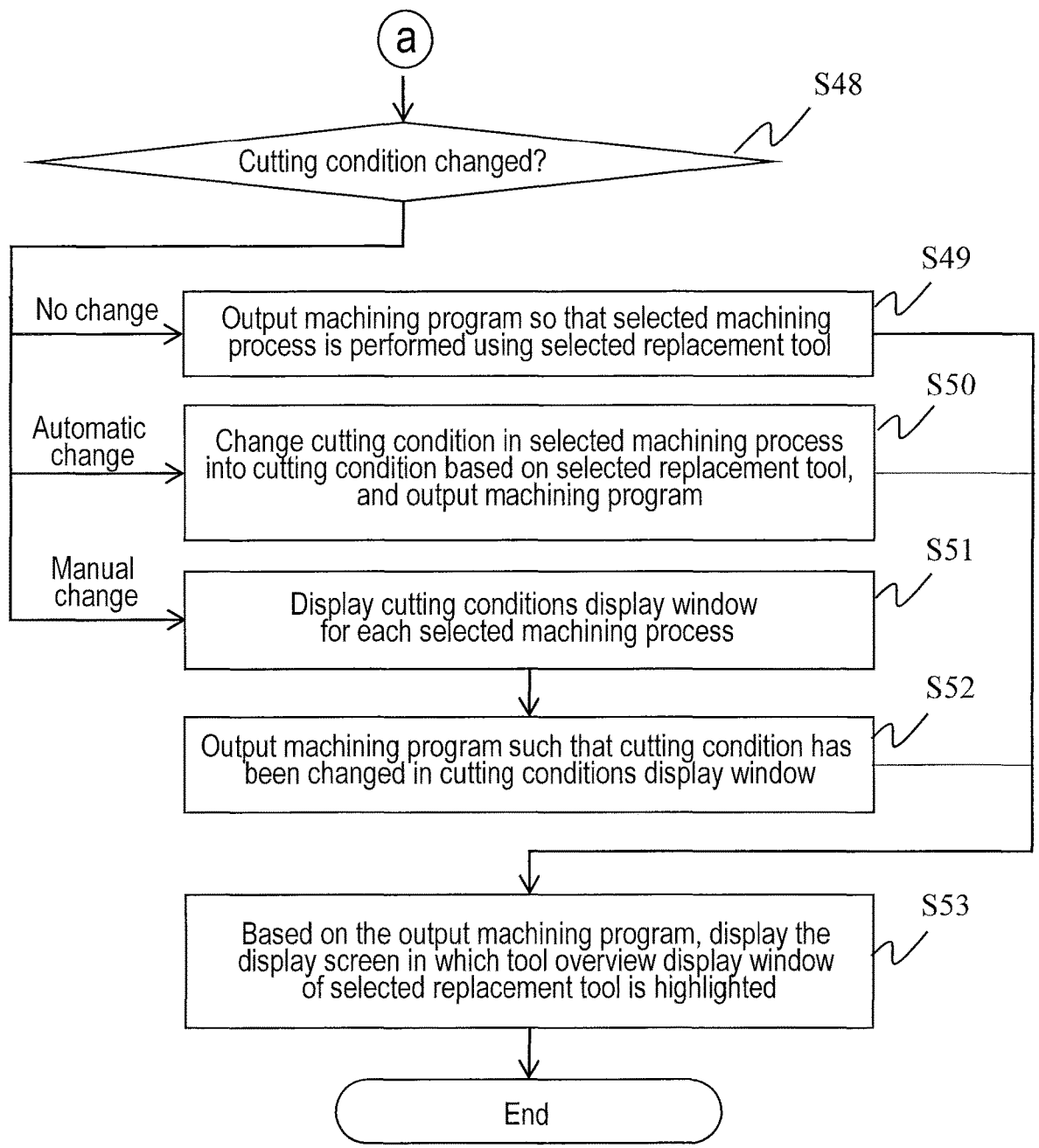

The load display program 221 (156) may rewrite the machining program 157 so that another tool Ta is used instead of the tool Ta used when the machining program 157 is executed. This shortens the machining time in that a tool having a long period of usage time in the machining program 157 can be replaced with another tool usable in machining under better conditions. FIGS. 13A and 13B are flowcharts of tool exchanging processing performed by the load display method according to this embodiment and the load display program 221 (156).

First, the processor (210) (151) receives a manipulation such as clicking and tapping on the tool overview display window 311 (step S41). The processor (210) (151) regards the manipulated tool overview display window 311 as the selected tool overview display window 311. The processor (210) (151) regards the tool Ta corresponding to the selected tool overview display window 311 as the selected tool. Next, the processor (210) (151) receive an exchange demand for exchanging the selected tool (step S42). Examples of the exchange demand include: a manipulation made on a button provided outside the display screen 30; a manipulation made on a menu displayed upon right-click of the mouse at the time of manipulation of the tool overview display window 311; and a manipulation made on a button displayed in a pop-up window at the time of manipulation of the tool overview display window 311. The exchange demand may also be a manipulation using any other GUI. When there is no exchange demand (No at step S42), the procedure returns to step S41.

When there is an exchange demand (Yes at step S42), the processor (210) (151) performs processing of displaying, on the display 240 (154), a tool data window 330 illustrated in FIG. 14 in such a manner that the tool data window 330 is superimposed over the display screen 30 (step S43). In this embodiment, the tool data window 330 will occasionally be referred to as first selection window. At step S43, upon selection of the selected tool from a plurality of tools displayed, the display 240 (154) displays the first selection window, which is for selecting at least one replacement tool replaceable with the selected tool. Some items displayed in FIGS. 5 and 14 are identical to each other and assigned identical reference numerals. These items will not be elaborated upon here. The tool data window 330 shows a list of tools identical in kind to the selected tool. That is, the above-described at least one replacement tool is a tool identical in kind to the selected tool. The processor (210) (151) is able to identify a tool identical in kind to the selected tool Ta from tool Ta names in the tool information 158. Even though a tool is identical in kind to the selected tool Ta, it is possible that the tool cannot be used in any machining process in which the selected tool Ta is used (for example, in the machining process of hole machining, a drill may have a tool diameter larger than the diameter of the hole). When the processor (210) (151) is capable of automatically identifying such tool, the tool may not necessarily be included in the list in the tool data window 330.

In FIG. 14, the selected tool Ta is a turning tool, and the tool data window 330 shows a list of turning tools replaceable with the selected turning tool. In FIG. 14, the tool data window 330 shows T number 313, tool name 315, size 317, and suffix 318. In addition, the tool data window 330 shows tool information common to the turning tools, namely, spindle rotation direction/cutting edge orientation 332, turning tool holder kind 333, R value 334, cutting angle 335, and cutting edge angle 336. That is, the processor (210) (151) performs processing of displaying, in the first selection window in the display 240 (154), the tool information that is associated with the at least one replacement tool and that is common to the tools of identical kind. The values 332 to 336 are correlated with each other as the tool information of one tool, on an each-row 331 basis. When the selected tool Ta is a different kind of tool, at least one of the size 317, the spindle rotation direction/cutting edge orientation 332, the turning tool holder kind 333, the R value 334, the cutting angle 335, and the cutting edge angle 336 may be replaced with another piece of information compatible with the kind of the selected tool Ta. In FIG. 14, legends 331a to 331h are assigned on an each-row basis, and tools corresponding to the respective rows will be referred to as tools 331a to 331h.

The spindle rotation direction/cutting edge orientation 332 indicates, by way of the presence and absence of a frame 332a, whether the turning tool is pointed toward the first spindle 122 or the second spindle 123. In other words, the spindle rotation direction/cutting edge orientation 332 indicates whether the indexing angle of the tool is 0 degrees or 180 degrees. No frames 332a are provided in the turning tools 331d to 331f and 331h, which indicates that the turning tools are pointed toward the first spindle 122 and have an indexing angle of 0 degrees. Frames 332a are provided in the turning tools 331a to 331c and 331g, which indicates that the turning tools are pointed toward the second spindle 123 and have an indexing angle of 180 degrees. The spindle rotation direction/cutting edge orientation 332 uses an arrow 332b to show the rotation direction (clockwise or counterclockwise), as seen from the turning tool, of the spindle toward which the turning tool is pointed. The spindle rotation direction/cutting edge orientation 332 uses legend 332c to show whether the turning tool is left-handed or right-handed. In the example illustrated in FIG. 14, all the turning tools 331a to 331h are left-handed. When a turning tool is right-handed, the legend 332c is denoted with another sign (for example, "R"). The holder kind 333 indicates the kind of the holder by which the turning tool is held. The example illustrated in FIG. 14 indicates that all the holders by which the turning tool is held are normal holders.

Figure 15:
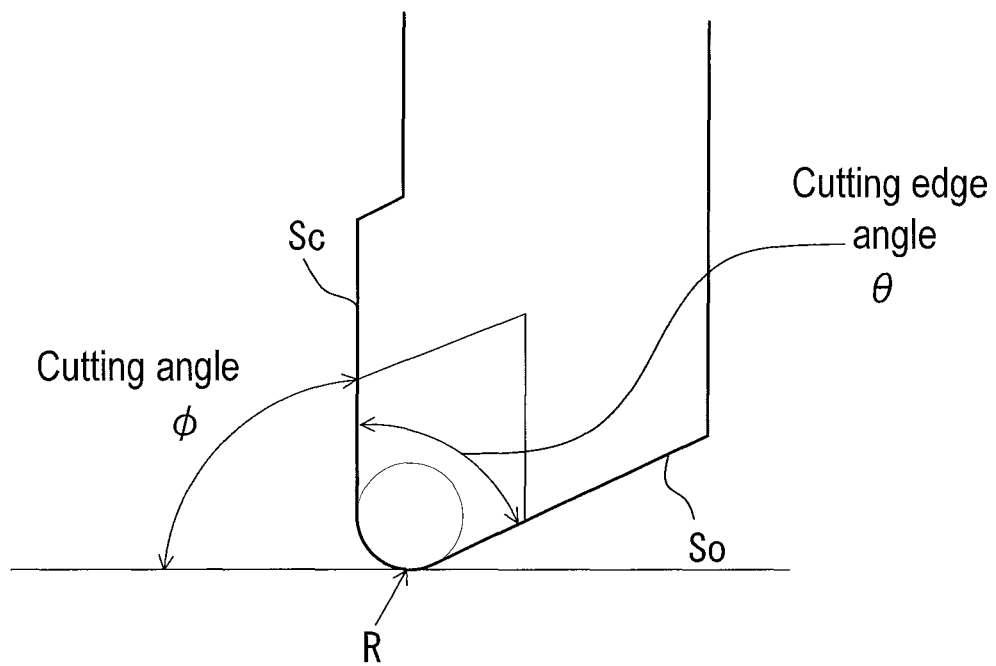
FIG. 15 illustrates part of tool information of a machining tool.

FIG. 15 is a drawing for describing the R value 334, the cutting angle 335, and the cutting edge angle 336. FIG. 15 is a schematic enlarged view of a leading end portion of a turning tool. The R value 334 indicates a curvature radius R of an arc specifying a cutting edge shape used in nose R compensation. The cutting angle 335 is the angle formed by the surface of the turning object and the cutting face, Sc, of the turning tool. As used herein, the term "cutting face Sc" is intended to mean the face of the turning tool along which cutting chips are discharged with friction. The cutting edge angle 336 is the angle formed by the cutting face Sc and an outer face So of the turning tool opposite to the cutting face Sc. The spindle rotation direction/cutting edge orientation 332, the R value 334, the cutting angle 335, and the cutting edge angle 336 are information concerning the shape and movement restrictions of the cutting edge of the replacement tool. This enables the user to determine whether an intended machining can be performed using the replacement tool. Also, the holder kind 333 is information concerning how to hold the replacement tool. Tools cannot be exchanged between different kinds of holders. In light of this, the user is able to use the holder kind 333 to determine whether the selected tool is replaceable. The above-described tool information common to the tools of identical kind includes at least one of: the information concerning the shape and movement restrictions of the cutting edge of the replacement tool; and the information concerning how to hold the replacement tool.

In a lower right corner portion of the tool data window 330, arrow buttons 338a and 338b are displayed. Upon manipulation of the arrow buttons 338a and 338b by way of an operation such as clicking and tapping in the tool data window 330, other tool information corresponding to the respective turning tools 331a to 331h are displayed in the tool data window 330.

Figure 16:
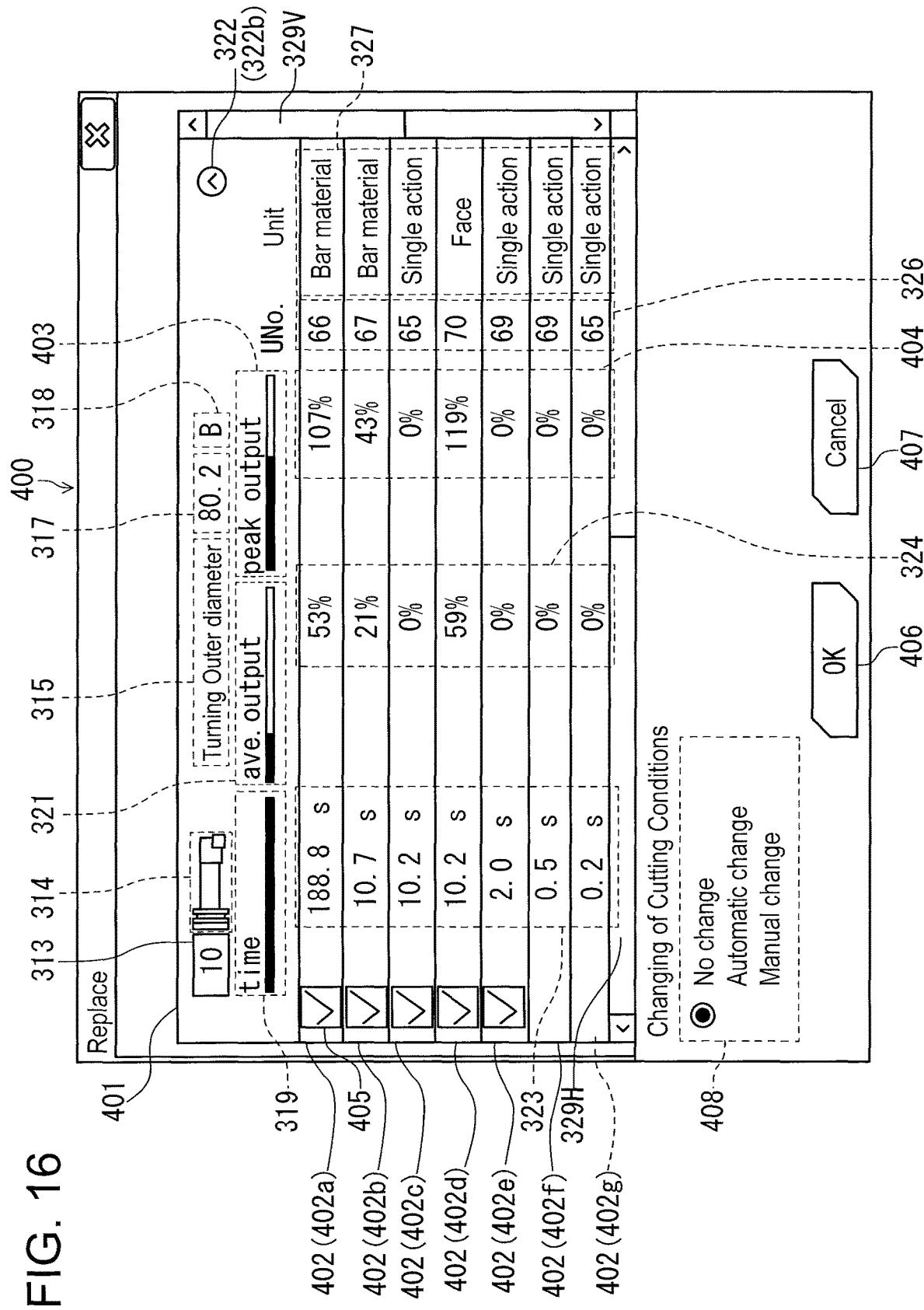
FIG. 16 illustrates an example machining process selection window.

Referring again to FIGS. 13A and 13B, after the tool data window 330 is displayed (at step S43), the processor (210) (151) receives a manipulation such as clicking and tapping on the row 331 in the tool data window 330 (step S44). The processor (210) (151) regards the tool Ta corresponding to the manipulated row 331 as the selected tool Ta. In this embodiment, the selected tool Ta will be referred to as selected replacement tool. FIG. 14 illustrates an example in which the row in which the tool 331c is displayed is selected, and the tool 331c is the selected replacement tool. In a lower end portion of the tool data window 330, an OK button 337 is located. Upon manipulation of the OK button 337 by way of an operation such as tapping and clicking, the processor (210) (151) performs processing of displaying, on the display 240 (154), a machining process selection window 400 as illustrated in FIG. 16 (step S45). The machining process selection window 400 is a window for the selected replacement tool. In this embodiment, the machining process selection window 400 will be referred to as second selection window.

Some items displayed in FIGS. 5 and 16 are identical to each other and assigned identical reference numerals. These items will not be elaborated upon here. The machining process selection window 400 includes: a tool overview display window 401, which is associated with the selected replacement tool; and at least one machining process display window 402, which displays a machining process of exchange candidate. The processor (210) (151) causes the display 240 (154) to display machining process display windows 402 corresponding to the respective machining processes in which the selected replacement tool is used. That is, upon selection of one selected replacement tool of at least one replacement tool, the display 240 (154) displays the second selection window, which is for selecting at least one selected replacement tool machining process from at least one machining process in which the selected tool is used. The tool overview display window 401 is similar to the tool overview display window 311, and the machining process display window 402 is similar to the machining process display window 312. The tool overview display window 401 displays the T number 313, the tool name 315, the size 317, the suffix 318, the bar chart 319, and the bar chart 321 that are associated with the selected replacement tool. In addition, the tool overview display window 401 displays a bar chart 403, which is associated with the selected replacement tool. The maximum value displayed in the bar chart 403 corresponds to power ratio 200%. The bar length of the bar chart 403 corresponds to a ratio, to power ratio 200%, of the largest value of the peak values of the cutting power parameter in the machining process in which the selected tool is used. It is to be noted, however, that the display content of the tool overview display window 401 will not be limited to the content illustrated in FIG. 16. The tool overview display window 401 may display information identical to the information displayed in the tool overview display window 311, or may display information different from the information displayed in the tool overview display window 401 illustrated in FIG. 16 or the information displayed in the tool overview display window 311.

The machining process display window 402 displays information associated with each machining process, namely, the usage time 323 of tool Ta, the average value (average power ratio) 324 of the cutting power parameter, the unit number 326, and information 327 for identifying the machining content of the machining unit of the unit number 326. In addition, the machining process display window 402 displays, for each machining process, a peak value (power ratio peak value) 404 of the cutting power parameter. That is, the processor (210) (151) displays, in the second selection window in the display 240 (154), at least one of the following information for each of the at least one machining process in which the selected tool is used: the usage time of the selected tool; the path length of the selected tool for cutting work; the average value of the cutting power parameter corresponding to the cutting power applied to the selected tool; and the peak value of the cutting power parameter.

The machining process display window 402 is different from the machining process display window 312 in that the machining process display window 402 includes a machining process selection interface 405. The machining process selection interfaces 405 are interfaces such as check boxes and allow multiple choices to be made. While in FIG. 16 each machining process selection interface 405 is displayed in the form of a check box, it is possible to use any other interface insofar as multiple choices can be made. The processor (210) (151) obtains a selectable machining process from among all the machining processes in which the selected replacement tool is used. The selectable machining process is a machining process that does not meet exclusion conditions, described later. Then, the processor (210) (151) performs processing of displaying, on the display 240 (154), the machining process display window 402 corresponding to the selectable machining process in such a manner that the machining process display window 402 includes the machining process selection interface 405. In other words, the processor (210) (151) performs processing of displaying, in the second selection window in the display 240 (154), a machining process that is among at least one machining process in which the selected tool is used and that is replaceable with the selected replacement tool. The machining process is displayed in such a manner that the rest of the at least one machining process in which the selected tool is used is not selectable.

Examples of the exclusion conditions are the following conditions.
  (a) A different kind of holder is used in the machining process.
  (b) The machining process contradicts another process in the machining program 157.
  (c) Where the machine tool 100 includes a plurality of tool spindles, the selected replacement tool is mounted on another tool spindle in the machining process.

In a right end portion of the machining process selection window 400, the scroll bar 329V is displayed. In the lower end portion of the tool list window 310, the scroll bar 329H is displayed. By moving the scroll bar 329V, the user is able to cause a desired machining process display window 402 to be displayed. By moving the scroll bar 32911, the user is able to cause another piece of information of the machining process to be displayed in the machining process selection window 400.

Referring again to FIGS. 13A and 13B, after displaying the machining process selection window 400 (step S45), the processor (210) (151) receives a manipulation such as clicking and tapping on the machining process selection interface 405 (step S46). The processor (210) (151) regards the selected machining process corresponding to the machining process selection interface 405 as the selected machining process. FIG. 16 illustrates an example in which the machining process selection interfaces 405 corresponding to the respective machining process display windows 402a to 402e are displayed, and all the machining process selection interfaces 405 displayed are selected. Thus, the machining processes corresponding to the respective machining process display windows 402a to 402e are in selected state.

Next, the processor (210) (151) receives a tool replacement command for the selected machining process (step S47). Referring to FIG. 16, in a lower end portion of the machining process selection window 400, an OK button 406 and a cancel button 407 are displayed. Upon manipulation of the cancel button 407 by way of an operation such as tapping and clicking, the tool replacement command is regarded as being canceled, and the procedure returns to step S41. Upon manipulation of the OK button 406 by way of an operation such as tapping and clicking, the processor (210) (151) refers to a specifying window 408, which is associated with a change in the cutting condition in the machining process selection window 400 (step S48).

In the specifying window 408, "Not changed" is specified by default. It is possible, however, for the user to, before manipulating the OK button 406, manipulate the radio buttons of the specifying window 408 to specify "Automatic change" or "Manual change". It is to be noted that the interface of the specifying window 408 may be other than radio buttons, examples including other inputting means such as selection boxes and check boxes.

When no change has been specified as being made in the cutting condition, the processor (210) (151) outputs the machining program 157 so that the selected machining process is performed using the selected replacement tool (step S49). When automatic change in the cutting condition has been specified, the processor (210) (151) changes the cutting condition in the selected machining process into a cutting condition that is based on the selected replacement tool, and outputs the machining program 157 (step S50). Examples of the cutting condition that is based on the selected replacement tool include: such a cutting condition that the spindle rotational speed is kept within a range that does not exceed the upper-limit rotational speed 368; such a cutting condition that the power ratio peak value is kept within a range below a predetermined threshold (for example, 100%); and such a cutting condition that the conversion value of the cutting power parameter is kept within a range that does not exceed the short-time rated output 367 of the motor.

When manual change in the cutting condition has been specified, the processor (210) (151) performs processing of displaying, on the display 240 (154), the cutting conditions display window 350 and the additional information 360 for each selected machining process, as illustrated in FIG. 12 (step S51). Then, the processor (210) (151) outputs the machining program 157 such that the cutting condition has been changed in the cutting conditions display window 350 (step S52). It is to be noted that instead of performing steps S51 and S52, the processor (210) (151) may output the machining program 157 in which a code associated with the selected machining process has been removed. In this case, a programmer would edit the machining program 157 later using another program editor.

A configuration common to steps S49, S50, and S52 is that the processor (210) (151) only changes the machining processes in the machining program 157, and does not change the shape sequence, and thus that in the post-change machining program 157, a machined shape substantially identical to the machined shape formed using the selected tool is formed. Thus, upon selection of at least one selected replacement tool machining process (step S46), the processor (210) (151), at steps S49, S50, and S52, calculates the cutting parameter of the selected replacement tool for each of the at least one selected replacement tool machining process so that a machined shape substantially identical to the machined shape formed using the selected tool is formed. Then, upon receipt of a command for replacing the tool used in at least one selected replacement tool machining process from the selected tool to the selected replacement tool (Yes at step S47), the processor (210) (151) replaces the tool used in at least one selected replacement tool machining process in the machining program from the selected tool to the selected replacement tool. Then, the processor (210) (151) outputs a second correction machining program in which the cutting parameter of the selected tool has been changed to the cutting parameter of the selected replacement tool.

Lastly, the processor (210) (151) causes the tool data window 330 and the machining process selection window 400 to disappear; and based on the machining program 157 that has been output, performs processing of displaying, on the display 240 (154), the display screen 30 in which the tool overview display window 311 of the selected replacement tool is highlighted (step S53). In performing this processing, the processor (210) (151) calculates load information of the selected replacement tool based on the calculated cutting parameter of the selected replacement tool. The display 240 (154) displays the calculated load information.

Second Embodiment

In the first embodiment, description has been made with regard to a tool load display method which is performed in the machining program 157 and by which the material, shape, and final machined shape of the pre-machined workpiece W1 can be managed. The load display program 221 (156) may also be used for the machining program 157a, which uses a G code standardized as ISO 6983. In the second embodiment, description will be made with regard to: the display screen 30a, which is associated with the machining program 157*a*; and operations of the load display program 221*a* (156*a*), which is associated with the machining program 157*a* and performs processing of changing the cutting conditions. It is to be noted that tool exchanging processing cannot be performed in the load display program 221*a* (156*a*) according to this embodiment. It is to be noted, however, that the shape and arrangement of the pre-machined workpiece W1 can also be input in the load display program 221*a* (156*a*), in addition to the machining program 157*a*. It is also to be noted that those processings common to the load display program 221*a* (156*a*) and the load display program 221 (156) will not be elaborated upon here.

Next, content of the machining program 157*a* will be described. In this embodiment, the machining program 157*a* is described in program codes for numerical control of the machine tool 100. Each program code is a character string made up of alphabets and numerical values. For example, the following codes are prepared.

NG code: Code specifying preparation function (for example, how the tool moves) for performing machining M code: Code playing a supplemental role for G code (note that tool exchange is performed at M06 command).

T number: Number specifying machining tool.

S number: Number specifying spindle rotational speed and/or other characteristics of the machine tool.

F number: Number specifying feed rate and/or other characteristics of the turning tool.

X, Y, Z, U, V, W, A, B, C: Symbols specifying coordinate axes.

N+numerical value: sequence number specifying a jump position in the program.

Thus, the machining process in the first embodiment is defined such that one machining process is equivalent to a processing performed in the machining program 157*a* between the time when a T-numbered M06 command is called and the time when a next T-numbered M06 command is called. It is possible, however, that even during the time between calling of a T-numbered M06 command and calling of a next T-numbered M06 command, an S number or an F number is called a plurality of times and the cutting condition is changed. In this case, it is possible to regard, as one machining process, a processing of the machining program 157*a* specified by cutting conditions defined by a combination of an S number and an F number. It is to be noted that in the machining program 157*a*, the cutting speed and cutting depth described in the first embodiment are not described in the program codes of the machining program 157*a*. Under the circumstances, in the second embodiment, it will be assumed that the cutting conditions of the tool Ta include only the feed rate and the spindle rotational speed. Thus, in the second embodiment, the feed rate of the workpiece and the rotational speed (spindle rotational speed) of the spindle configured to rotate the workpiece or each tool are defined in at least one machining process.

Figure 17:
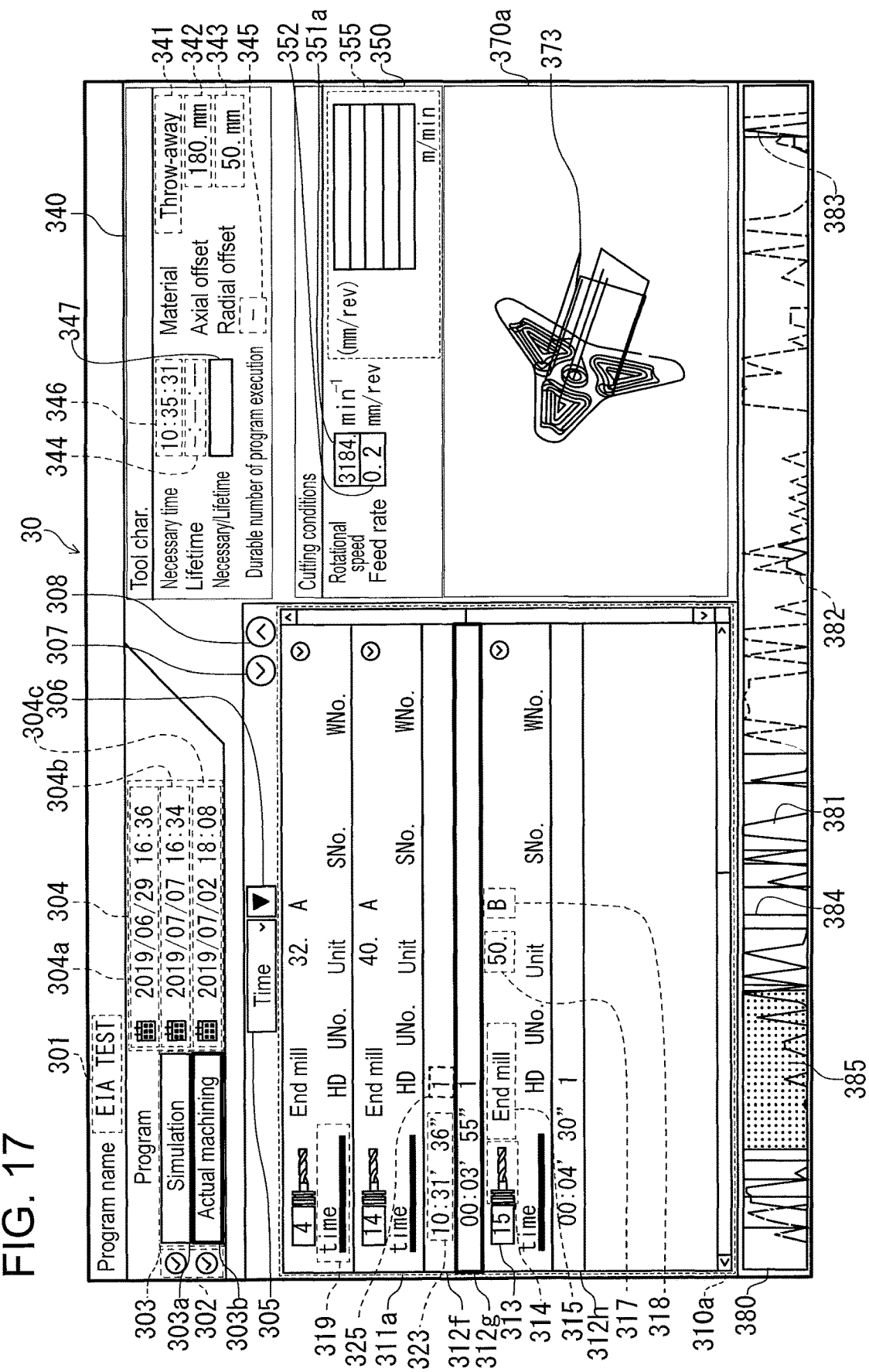
FIG. 17 illustrates an example display screen of a load display program according to a second embodiment.

In the second embodiment, the machining simulation data 164 does not include an estimated value of the cutting power parameter. It is to be noted, however, that the machining simulation data 164 includes the volume of the cut part obtained from the difference between the shape of the pre-machined workpiece W1 and a machined shape that is estimated from the movement path of the tool Ta. Thus, in the case where the machining simulation data 164 is selected in the data selector 303, any of the following can be selected on the sorting criterion selection interface 305: the usage time of the tool Ta; the volume of the cut part that is cut by the tool Ta; the path length of the tool Ta for cutting work; and the cutting work order. FIG. 17 illustrates an example in which the usage time of the tool Ta is selected on the sorting criterion selection interface 305. The tool overview display window 311*a* in the tool list window 310*a* displays the bar chart 319, other than the tool information 158. It is to be noted, however, that in FIG. 17, a bar chart indicating the volume of the cut part may be additionally displayed, as in FIG. 4 and other drawings. The machining process display windows 312*f,* 312*g,* and 312*h* display the usage time 323 and the spindle number 325 of the tool Ta. The cutting conditions display window 350*a* takes the cutting conditions in the second embodiment into consideration and displays spindle rotational speed 351*a* and the feed per revolution 352. It is to be noted that in the case where a G93 command is called, the feed per revolution 352 may be an inverse-time feed indicated by an F number, while in the case where a G94 command is called, the feed per revolution 352 may be a feed per minute indicated by an F number. It is to be noted that FIG. 17 illustrates an example in which the machining process corresponding to the machining process display window 312*f* is selected and in which the spindle rotational speed 351*a* and the feed per revolution 352 corresponding to the machining process are displayed. Thus, in the second embodiment, upon selection of the selected machining process displayed as one of the at least one machining process, the processor (210) (151) performs processing of displaying the feed rate corresponding to the selected machining process and the rotational speed of the spindle.

In FIG. 17, the cut part display window 370*a* displays the movement path, 373, of the in-use tool used in the selected machining process. That is, upon selection of the selected machining process displayed as one of the at least one machining process, the processor (210) (151) performs processing of displaying the movement path of the in-use tool used in the selected machining process. It is to be noted that the movement path can be calculated using, for example: coordinate values specified by X, Y, Z, U, V, W, A, B, and C during the time between calling of a T-numbered M06 command and calling of a next T-numbered M06 command; and/or a linear interpolation and/or a circular interpolation specified by a G01 command, a G02 command, and a G03 command. The tool load time-series graph 380 is identical to the tool load time-series graph 380 according to the first embodiment. It is to be noted, however, that the cutting power parameter cannot be calculated in the second embodiment. Thus, in the case where the machining experience data 163 is selected using the button 303*b*, the tool load time-series graph 380 is displayed based on the cutting power parameter included in the machining experience data 163. In the case where the machining simulation data 164 is selected using the button 303*a*, or in the case where no machining experience data 163 exists and the button 303*b* is not selectable, the tool load time-series graph 380 is not displayed. It is to be noted, however, that in order to display the order and relative time length of each machining process in the tool load time-series graph 380, the vertical line 384 may be displayed, which indicates the time point of switch of the machining process.

Figure 18:
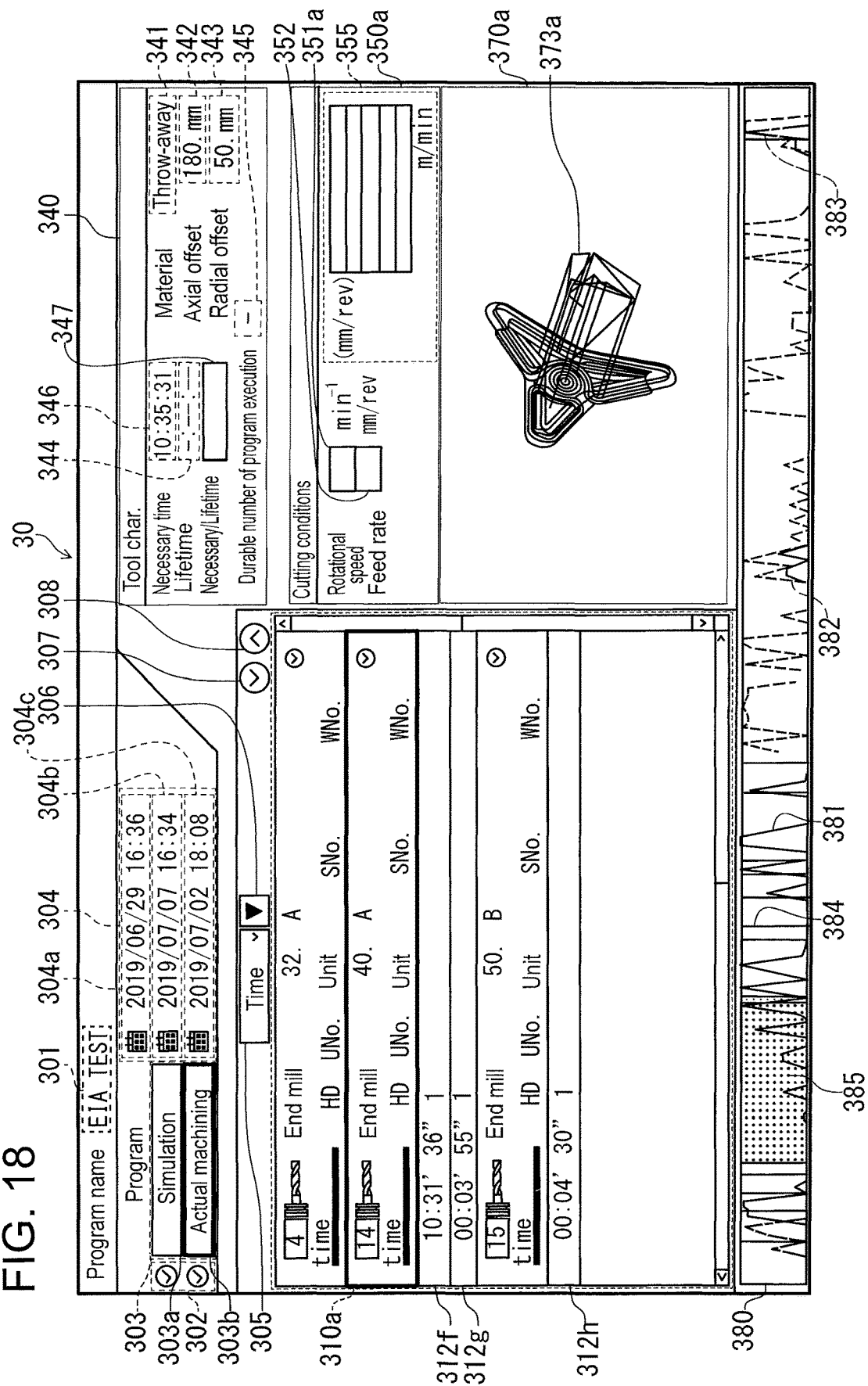
FIG. 18 illustrates another example display screen of the load display program according to the second embodiment.

The second embodiment is similar to the first embodiment in that by selecting the tool overview display window 311*a*, the tool (selected tool) displayed in the selected tool overview display window 311*a* can be selected. FIG. 18 illustrates an example in which an end mill of T number 14 is selected. In this case as well, in a state in which no machining process in which the tool Ta corresponding to the selected tool overview display window 311*a* is used is selected, the processor (210) (151) performs processing of displaying, in the cutting conditions display window 350a, cutting conditions common to the machining processes displayed in all the machining process display windows 312f and 312g. In this case, the machining process corresponding to the machining process display window 312f and the machining process corresponding to the machining process display window 312g are different from each other in the spindle rotational speed 351a and the feed per revolution 352. Therefore, the spindle rotational speed 351a and the feed per revolution 352 are displayed in blank. Also, in FIG. 18, the cut part display window 370a displays the movement paths 373a of the selected tool in all the machining processes in which the selected tool is used. That is, upon selection of a selected tool displayed as one of the plurality of tools, the processor (210) (151) performs processing of displaying the movement paths 373a of the selected tool in all the machining processes in which the selected tool is used.

Next, description will be made with regard to those respects in which the second embodiment is different from the first embodiment in terms of the steps in the flowcharts illustrated in FIGS. 8 and 10. In this embodiment, step S2 is omitted. In the generation of the machining simulation data 164 at step S4, the cutting power parameter is not calculated. In light of this, the movement path, the period of movement time, and the volume of the cut part are calculated. The sorting criterion set at step S6 can be selected from the usage time of tool Ta, the volume of the cut part that is cut by the tool Ta, the path length of the tool Ta for cutting work, and the cutting work order. The display of the tool list window 310a (the tool overview display window 311a or the machining process display window 312a) at step S8 and the display of the cutting conditions display window 350a and the cut part display window 370a at step S10 are different in display content. In regard to all the steps illustrated in FIG. 10, even in the case where the machining simulation data 164 is selected, processings similar to the processings in the first embodiment are performed by selecting the sectional area between the vertical line 384 and the vertical line 384. It is to be noted, however, that at step S26, the processor (210) (151) performs processing of: identifying the in-use tool used in the machining process corresponding to the selected period of time; and displaying the movement path of the in-use tool used in the machining process corresponding to the selected period of time.

Figure 19:
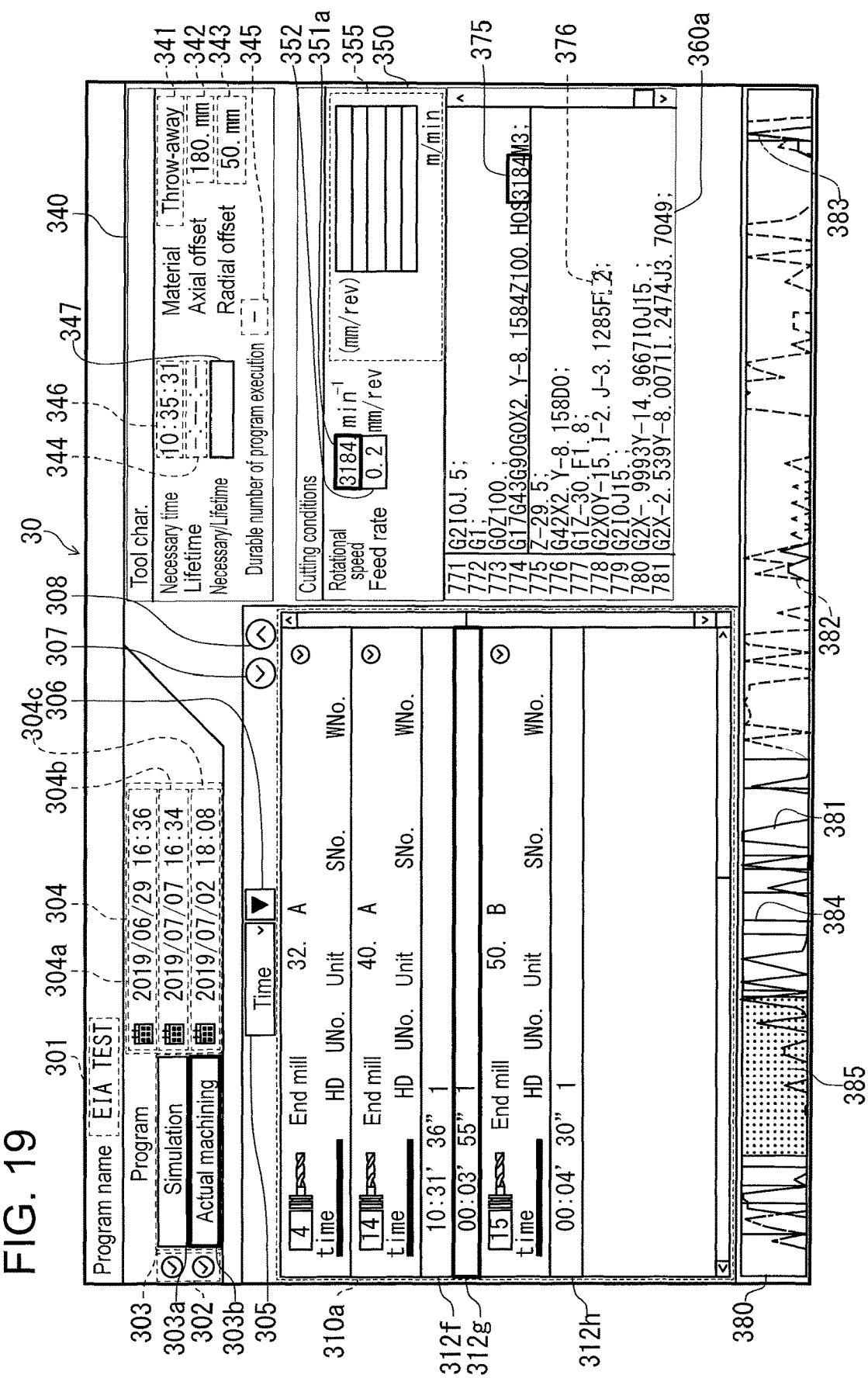
FIG. 19 illustrates an example window displayed in changing of a cutting condition in the second embodiment.

Next, the cutting condition changing method according to the second embodiment will be described. Description will be made below with regard to those respects in which the second embodiment is different from the first embodiment in terms of the steps in the flowchart according to as illustrated in FIG. 11. At step S31, the processor (210) (151) receives an input manipulation such as clicking and tapping on one displayed item of the displayed items 351a and 352 in the cutting conditions display window 350a. Upon receipt of an input manipulation, the processor (210) (151) changes the one displayed item into editable state (step S32). The processor (210) (151) performs processing of displaying the additional information 360a in the display screen 30 (step S33). FIG. 19 illustrates an example in which the form of the spindle rotational speed 351a is tapped, so that the form is activated, and in which a program code display window 360a is displayed as additional information on the display screen 30. In the additional information 360a, a part 375 of the program code corresponding to the displayed item 351a that has been input by a manipulation is highlighted. Examples of the highlighting include a display in inverted black and white and a cursor display. It is to be noted that in the case of an input manipulation of the displayed item 352 is received, another part 376 is highlighted.

At step S34, upon manipulation of the forms of the displayed items 351a and 352 to rewrite the numerical values, the processor (210) (151) receives the manipulation as a numerical value change in one displayed item that is either the displayed item 351a or 352 and that is in editable state. Then, at step S35, in response to the numerical value change, the processor (210) (151) rewrites the part 375 of the program code corresponding to the numerical value. In this manner, the processor (210) (151) updates the content of the additional information 360. At and after step S36, the processor (210) (151) in the second embodiment performs operations identical to the operations performed in the first embodiment.

Modifications of Tool Data Window

A basic description of the display screen 30 has been provided above. It is to be noted, however, that the above-described examples are not intended as limiting the tool list window 310, the tool data window 330, the tool characteristics display window 340, the cutting conditions display window 350, the cut part display window 370, the tool load time-series graph 380, the pop-up window 390, and the machining process selection window 400. For example, it is possible to additionally display any other parameter or omit some of the parameters. It is also to be noted that there may be only a single spindle to support the workpiece W1 or there may be two or more tool spindles, in accordance with specifications of the machine tool 100. It is also to be noted that the machine tool 100 may include another tool base for a lower cutting edge. It is further to be noted that various other configurations are possible for the rotation axes of the spindles 114, 122, and 123. For example, the tool spindle 114 may not necessarily be rotatable in the Y axis direction. The embodiments are applicable as well to such machine tool 100.

The order in which the steps in the flowcharts illustrated in FIGS. 8, 10, 11, 13A, and 13B are performed is changeable insofar as the same processing result is obtained. Also, in FIG. 8, step S4 may be moved before step S1, or it is possible to end step S4 without performing nothing step S4. Step S11 may be omitted.

Operations and Effects of the Embodiments

According to a first aspect of the present disclosure, the tool load displaying method for a machine tool, the machine tool 100, and the load display program 221 (156) include: inputting the machining program 157, which specifies a plurality of tools Ta used during machining work and which specifies at least one machining process, the at least one machining process constituting the machining work, each of the at least one machining process being performed by using each of the plurality of tools Ta; calculating at least one piece of load information corresponding to each of the plurality of tools Ta during each of the at least one machining process based on the machining program 157; and displaying the plurality of tools Ta in turn based on the value of the selected load information, which is one of the at least one piece of load information.

According to a second aspect of the present disclosure, the tool load display method according to the first aspect further includes displaying, next to each of the plurality of tools, the at least one machining process performed by using each of the plurality of tools.

According to a third aspect of the present disclosure, in the tool load display method according to the second aspect, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools is defined in the at least one machining process.

According to a fourth aspect of the present disclosure, the tool load display method according to the third aspect further includes, upon selecting the selected machining process from the at least one machining process displayed, displaying at least one of the cutting depth, the feed rate, the cutting speed, and the rotational speed of the spindle in association with the selected machining process.

According to a fifth aspect of the present disclosure, the tool load display method according to the third aspect or the fourth aspect further includes displaying the cutting speed and the feed rate corresponding to the selected machining process and the cutting speed and the feed rate corresponding to a different machining process different from the selected machining process in which each of the plurality of tools is used such that the cutting speeds are comparable with each other and the feed rates are comparable with each other.

According to a sixth aspect of the present disclosure, the tool load display method according to any one of the third to fifth aspects further includes displaying a graph that shows, in a time-series manner, a cutting power parameter corresponding to cutting power applied to each of the plurality of tools between a start and an end of the machining program.

According to a seventh aspect of the present disclosure, the tool load display method according to the sixth aspect further includes, upon selecting the selected machining process from the at least one machining process displayed, highlighting a period of time in which the selected machining process is performed.

According to an eighth aspect of the present disclosure, the tool load display method according to the seventh aspect further includes, upon selecting a selected tool from the plurality of tools displayed, highlighting a period of time in which all machining processes in which the selected tool is used are performed.

According to a ninth aspect of the present disclosure, the tool load display method according to any one of the fourth aspect, the sixth aspect, the seventh aspect, and the eighth aspect further includes calculating, based on the cutting depth, the feed rate, and the cutting speed, a cutting power parameter corresponding to cutting power applied to each of the plurality of tools.

According to a tenth aspect of the present disclosure, the tool load display method according to any one of the second to ninth aspects further includes displaying, upon selecting the selected machining process from the at least one machining process displayed: a movement path of an in-use tool used in the selected machining process; or a machined part of a workpiece machined by using the in-use tool in the selected machining process.

According to an eleventh aspect of the present disclosure, the tool load display method according to the tenth aspect further includes displaying, upon selecting a selected tool from the plurality of tools displayed: movement paths of the selected tool in all machining processes in which the selected tool is used; or the machined part of the workpiece machined using the selected tool.

According to a twelfth aspect of the present disclosure, the tool load display method according to any one of the first to eleventh aspects further includes displaying, upon selecting a selected tool from the plurality of tools displayed, a characteristic of the selected tool.

According to a thirteenth aspect of the present disclosure, the tool load display method according to the twelfth aspect further includes displaying, together with the characteristic of the selected tool, at least one of a lifetime of the selected tool and a durable number of execution of the machining program in which the selected tool is used.

According to a fourteenth aspect of the present disclosure, the tool load display method according to any one of the first to thirteenth aspects further includes, upon selecting the selected machining process from the at least one machining process displayed, displaying a characteristic of an in-use tool used in the selected machining process.

According to a fifteenth aspect of the present disclosure, the tool load display method according to the fourteenth aspect further includes displaying, together with the characteristic of the in-use tool, at least one of a lifetime of the in-use tool and a durable number of execution of the machining program in which the in-use tool is used.

According to a sixteenth aspect of the present disclosure, the tool load display method according to the sixth aspect further includes: managing, using the graph, at least one period of time in which at least one machining process is performed; and upon selection of a selected period of time as one of the at least one period of time, highlighting a machining process corresponding to the selected period of time.

According to a seventeenth aspect of the present disclosure, the tool load display method according to the sixteenth aspect further includes displaying at least one of the cutting depth, the feed rate, the cutting speed, and the rotational speed of the spindle in association with the machining process corresponding to the selected period of time.

According to an eighteenth aspect of the present disclosure, the tool load display method according to the sixteenth aspect or the seventeenth aspect further includes displaying: a movement path of an in-use tool used in the machining process corresponding to the selected period of time; or a machined part of a workpiece machined using the in-use tool in the machining process corresponding to the selected period of time.

According to a nineteenth aspect of the present disclosure, the tool load display method according to any one of the sixteenth to eighteenth aspects further includes displaying a characteristic of the tool used in the machining process corresponding to the selected period of time.

According to a twentieth aspect of the present disclosure, in the tool load display method according to any one of the first to nineteenth aspects, the at least one piece of load information includes at least one of: usage time for which each of the plurality of tools is used in the machining process; a volume of a cut part that is cut by each of the plurality of tools in the machining process; a length of a path of each of the plurality of tools in the machining process; an average value of the cutting power parameter corresponding to cutting power applied to the tools in the machining process; and a maximum value of the cutting power parameter in the machining process.

According to a twenty-first aspect of the present disclosure, the tool load display method according to any one of the sixth aspect, the ninth aspect, and the twentieth aspect, the cutting power parameter is a ratio between continuous rated power of a motor configured to provide the cutting power to each of the plurality of tools and output power necessary for the motor to provide the cutting power.

According to a twenty-second aspect of the present disclosure, the tool load display method according to any one of the first to twenty-first aspects further includes calculating at least one piece of load information in the at least one machining process performed using each of the plurality of tools; obtaining a maximum value of values of the selected load information in all the at least one machining process performed using the tools; and displaying the plurality of tools in turn based on the maximum value.

According to a twenty-third aspect of the present disclosure, the tool load display method according to any one of the first to twenty-second aspects further includes: calculating at least one piece of load information in the at least one machining process performed using each of the plurality of tools; obtaining a sum of values of the selected load information on an each-tool basis; and displaying the plurality of tools in turn based on the sum.

According to a twenty-fourth aspect of the present disclosure, a machine tool includes a display; a memory to store a machining program that specifies a plurality of tools used during machining work and that specifies machining processes which constitute the machining work and each of which is performed by using each of the plurality of tools; and a processor configured to: calculate at least one piece of load information corresponding to each of the plurality of tools during each of the machining processes based on the machining program; and display the plurality of tools in turn on the display based on a value of selected load information that is one of the at least one piece of load information.

According to a twenty-fifth aspect of the present disclosure, in the machine tool according to the twenty-fourth aspect, the processor is configured to display, on the display and next to each of the plurality of tools, the at least one machining process performed using each of the plurality of tools.

According to a twenty-sixth aspect of the present disclosure, in the machine tool according to the twenty-fifth aspect, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools is defined in the at least one machining process.

According to a twenty-seventh aspect of the present disclosure, in the machine tool according to the twenty-sixth aspect, upon selecting the selected machining process from the at least one machining process displayed, the processor is configured to display, on the display, at least one of the cutting depth, the feed rate, the cutting speed, and the rotational speed of the spindle in association with the selected machining process.

According to a twenty-eighth aspect of the present disclosure, in the machine tool according to the twenty-sixth aspect or the twenty-seventh aspect, the processor is configured to display, on the display, the cutting speed and the feed rate corresponding to the selected machining process and the cutting speed and the feed rate corresponding to a different machining process different from the selected machining process in which each of the plurality of tools is used such that the cutting speeds are comparable with each other and the feed rates are comparable with each other.

According to a twenty-ninth aspect of the present disclosure, in the machine tool according to any one of the twenty-sixth to twenty-eighth aspects, the processor is configured to display, on the display, a graph that shows, in a time-series manner, a cutting power parameter corresponding to cutting power applied to each of the plurality of tools between a start and an end of the machining program.

According to a thirtieth aspect of the present disclosure, in the machine tool according to the twenty-ninth aspect, upon selecting the selected machining process from the at least one machining process displayed, the processor is configured to highlight, on the display, a period of time in which the selected machining process is performed.

According to a thirty-first aspect of the present disclosure, in the machine tool according to the thirtieth aspect, upon selecting a selected tool from the plurality of tools displayed, the processor is configured to highlight, on the display, a period of time in which all machining processes in which the selected tool is used are performed.

According to a thirty-second aspect of the present disclosure, in the machine tool according to any one of the twenty-seventh aspect, the twenty-ninth aspect, the thirtieth aspect, and the thirty-first aspect, the processor is configured to calculate, based on the cutting depth, the feed rate, and the cutting speed, a cutting power parameter corresponding to cutting power applied to each of the plurality of tools.

According to a thirty-third aspect of the present disclosure, in the machine tool according to any one of the twenty-fifth to thirty-second aspects, upon selecting the selected machining process from the at least one machining process displayed, the processor is configured to display, on the display: a movement path of an in-use tool used in the selected machining process; or a machined part of a workpiece machined using the in-use tool in the selected machining process.

According to a thirty-fourth aspect of the present disclosure, in the machine tool according to the thirty-third aspect, upon selecting a selected tool from the plurality of tools displayed, the processor is configured to display, on the display: movement paths of the selected tool in all machining processes in which the selected tool is used; or the machined part of the workpiece machined using the selected tool.

According to a thirty-fifth aspect of the present disclosure, in the machine tool according to any one of the twenty-fourth to thirty-fourth aspects, upon selecting a selected tool the plurality of tools displayed, the processor is configured to display a characteristic of the selected tool on the display.

According to a thirty-sixth aspect of the present disclosure, in the machine tool according to the thirty-fifth aspect, the processor is configured to display, on the display and together with characteristic of the selected tool, at least one of a lifetime of the selected tool and a durable number of execution of the machining program in which the selected tool is used.

According to a thirty-seventh aspect of the present disclosure, in the machine tool according to any one of the twenty-fourth to thirty-sixth aspects, upon selecting the selected machining process from the at least one machining process displayed, the processor is configured to display, on the display, a characteristic of an in-use tool used in the selected machining process.

According to a thirty-eighth aspect of the present disclosure, in the machine tool according to the thirty-seventh aspect, the processor is configured to display, on the display and together with the characteristic of the in-use tool, at least one of a lifetime of the in-use tool and a durable number of execution of the machining program in which the selected tool is used.

According to a thirty-ninth aspect of the present disclosure, in the machine tool according to the twenty-ninth aspect, the processor is configured to manage, using the graph, at least one period of time in which at least one machining process is performed. Upon selection of a selected period of time as one of the at least one period of time, the processor is configured to highlight, on the display, the machining process corresponding to the selected period of time.

According to a fortieth aspect of the present disclosure, in the machine tool according to the thirty-ninth aspect, the processor is configured to display, on the display, at least one of the cutting depth, the feed rate, the cutting speed, and the rotational speed of the spindle in association with the machining process corresponding to the selected period of time.

According to a forty-first aspect of the present disclosure, in the machine tool according to the thirty-ninth aspect or the fortieth aspect, the processor is configured to display, on the display: a movement path of an in-use tool used in the machining process corresponding to the selected period of time; or a machined part of a workpiece machined using the in-use tool in the machining process corresponding to the selected period of time.

According to a forty-second aspect of the present disclosure, in the machine tool according to any one of the thirty-ninth to forty-first aspects, the processor is configured to display, on the display, a characteristic of the tool used in the machining process corresponding to the selected period of time.

According to a forty-third aspect of the present disclosure, in the machine tool according to any one of the twenty-fourth to forty-second aspects, the at least one piece of load information includes at least one of: usage time for which each of the plurality of tools is used in the machining process; a volume of a cut part that is cut by each of the plurality of tools in the machining process; a length of a path of each of the plurality of tools in the machining process; an average value of the cutting power parameter corresponding to cutting power applied to the tools in the machining process; and a maximum value of the cutting power parameter in the machining process.

According to a forty-fourth aspect of the present disclosure, in the machine tool according to any one of the twenty-ninth aspect, the thirty-second aspect, and the forty-third aspect, the cutting power parameter is a ratio between continuous rated power of a motor configured to provide the cutting power to each of the plurality of tools and output power necessary for the motor to provide the cutting power.

According to a forty-fifth aspect of the present disclosure, in the machine tool according to any one of the twenty-fourth to forty-fourth aspects, the processor is configured to: calculate at least one piece of load information in the at least one machining process performed using each of the plurality of tools; obtain a maximum value of values of the selected load information in all the at least one machining process performed using the tools; and display the plurality of tools in turn based on the maximum value.

According to a forty-sixth aspect of the present disclosure, in the machine tool according to any one of the twenty-fourth to forty-fifth aspects, the processor is configured to calculate at least one piece of load information in the at least one machining process performed using each of the plurality of tools; obtain a sum of values of the selected load information on an each-tool basis; and display the plurality of tools in turn based on the sum.

According to a forty-seventh aspect of the present disclosure, a program for a machine tool is for performing processing including: inputting a machining program that specifies a plurality of tools used during machining work and that specifies machining processes which constitute the machining work and each of which is performed by using each tool of the plurality of tools; calculating at least one piece of load information corresponding to each of the plurality of tools during each of the machining processes based on the machining program; and displaying the plurality of tools in turn based on a value of selected load information that is one of the at least one piece of load information.

According to a forty-eighth aspect of the present disclosure, the program according to the forty-seventh aspect further includes processing of displaying, next to each of the plurality of tools of the plurality of tools, the at least one machining process performed by using each of the plurality of tools.

According to a forty-ninth aspect of the present disclosure, in the program according to the forty-eighth aspect, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools is defined in the at least one machining process.

According to a fiftieth aspect of the present disclosure, the program according to the forty-ninth aspect further includes processing of, upon selecting the selected machining process from the at least one machining process displayed, displaying at least one of the cutting depth, the feed rate, the cutting speed, and the rotational speed of the spindle in association with the selected machining process.

According to a fifty-first aspect of the present disclosure, the program according to the forty-ninth aspect or the fiftieth aspect further includes processing of displaying the cutting speed and the feed rate corresponding to the selected machining process and the cutting speed and the feed rate corresponding to a different machining process different from the selected machining process in which each of the plurality of tools is used such that the cutting speeds are comparable with each other and the feed rates are comparable with each other.

According to a fifty-second aspect of the present disclosure, the program according to any one of the forty-ninth to fifty-first aspects further includes processing of displaying a graph that shows, in a time-series manner, a cutting power parameter corresponding to cutting power applied to each of the plurality of tools between a start and an end of the machining program.

According to a fifty-third aspect of the present disclosure, the program according to the fifty-second aspect further includes processing of, upon selecting the selected machining process from the at least one machining process displayed, highlighting a period of time in which the selected machining process is performed.

According to a fifty-fourth aspect of the present disclosure, the program according to the fifty-third aspect further includes processing of, upon selecting a selected tool from the plurality of tools displayed, highlighting a period of time in which all machining processes in which the selected tool is used are performed.

According to a fifty-fifth aspect of the present disclosure, the program according to any one of the fiftieth aspect, the fifty-second aspect, the fifty-third aspect, and the fifty-fourth aspect further includes processing of calculating, based on the cutting depth, the feed rate, and the cutting speed, a cutting power parameter corresponding to cutting power applied to each of the plurality of tools.

According to a fifty-sixth aspect of the present disclosure, the program according to any one of the forty-eighth to fifty-fifth aspects further includes processing of displaying, upon selecting the selected machining process from the at least one machining process displayed: a movement path of an in-use tool used in the selected machining process; or a machined part of a workpiece machined using the in-use tool in the selected machining process.

According to a fifty-seventh aspect of the present disclosure, the program according to the fifty-sixth aspect further includes processing of, upon selecting a selected tool from the plurality of tools displayed, displaying: movement paths of the selected tool in all machining processes in which the selected tool is used; or the machined part of the workpiece machined using the selected tool.

According to a fifty-eighth aspect of the present disclosure, the program according to any one of the forty-seventh to fifty-seventh aspects further includes processing of, upon selecting a selected tool from the plurality of tools displayed, displaying a characteristic of the selected tool.

According to a fifty-ninth aspect of the present disclosure, the program according to the fifty-eighth aspect further includes processing of displaying, together with the characteristic of the selected tool, at least one of a lifetime of the selected tool and a durable number of execution of the machining program in which the selected tool is used.

According to a sixtieth aspect of the present disclosure, the program according to any one of the forty-seventh to fifty-ninth aspects further includes processing of, upon selecting the selected machining process from the at least one machining process displayed, displaying a characteristic of an in-use tool used in the selected machining process.

According to a sixty-first aspect of the present disclosure, the program according to the sixtieth aspect further includes processing of displaying, together with the characteristic of the in-use tool, display at least one of a lifetime of the in-use tool and a durable number of execution of the machining program in which the selected tool is used.

According to a sixty-second aspect of the present disclosure, the program according to the fifty-second aspect further includes processing of: managing, using the graph, at least one period of time in which at least one machining process is performed; and upon selection of a selected period of time as one of the at least one period of time, highlighting the machining process corresponding to the selected period of time.

According to a sixty-third aspect of the present disclosure, the program according to the sixty-second aspect further includes processing of displaying at least one of the cutting depth, the feed rate, the cutting speed, and the rotational speed of the spindle in association with the machining process corresponding to the selected period of time.

According to a sixty-fourth aspect of the present disclosure, the program according to the sixty-second aspect or the sixty-third aspect further includes processing of displaying: a movement path of an in-use tool used in the machining process corresponding to the selected period of time; or a machined part of a workpiece machined using the in-use tool in the machining process corresponding to the selected period of time.

According to a sixty-fifth aspect of the present disclosure, the program according to any one of the sixty-second to sixty-fourth aspects further includes processing of displaying a characteristic of the tool used in the machining process corresponding to the selected period of time.

According to a sixty-sixth aspect of the present disclosure, in the program according to any one of the forty-seventh to sixty-fifth aspects, the at least one piece of load information includes at least one of: usage time for which each of the plurality of tools is used in the machining process; a volume of a cut part that is cut by each of the plurality of tools in the machining process; a length of a path of each of the plurality of tools in the machining process; an average value of the cutting power parameter corresponding to cutting power applied to the tools in the machining process; and a maximum value of the cutting power parameter in the machining process.

According to a sixty-seventh aspect of the present disclosure, in the program according to any one of the forty-seventh to sixty-fifth aspects, the cutting power parameter is a ratio between continuous rated power of a motor configured to provide the cutting power to each of the plurality of tools and output power necessary for the motor to provide the cutting power.

According to a sixty-eighth aspect of the present disclosure, the program according to any one of the forty-seventh to sixty-seventh aspects further includes processing of: calculating at least one piece of load information in the at least one machining process performed using each of the plurality of tools; obtaining a maximum value of values of the selected load information in all the at least one machining process performed using the tools; and displaying the plurality of tools in turn based on the maximum value.

According to a sixty-ninth aspect of the present disclosure, the program according to any one of the forty-seventh to the sixty-eighth aspect further includes processing of: calculating at least one piece of load information in the at least one machining process performed using each of the plurality of tools; obtaining a sum of values of the selected load information on an each-tool basis; and displaying the plurality of tools in turn based on the sum.

The tool load displaying method according to the first aspect in a machine tool, the machine tool according to the twenty-fourth aspect, and the program according to the forty-seventh aspect for the machine tool make it easier to find a high-load tool in a machining program.

The second aspect, the twenty-fifth aspect, and the forty-eighth aspect make it easier to find a machining process that needs improving in a machining program.

Regarding the third aspect, the twenty-sixth aspect, and the forty-ninth aspect, the cutting depth, the feed rate, the cutting speed, and the rotational speed of the spindle affect both the tool usage time and the tool cutting power. In light of this fact, by ensuring that an analysis can be made for each machining process in which these parameters are managed, the machining program can be more easily studied for improvements.

In the fourth aspect, the twenty-seventh aspect, and the fiftieth aspect, at least one of the cutting depth, the feed rate, the cutting speed, and the rotational speed of the spindle that correspond to the selected machining process is displayed. This makes it even easier to study the machining program for improvements.

In the fifth aspect, the twenty-eighth aspect, and the fifty-first aspect, the cutting speed and the feed rate in the selected machining process and the cutting speed and the feed rate in a different machining process can be compared with each other. This makes it easier to consider the degree of adjustment of the cutting speed and the feed rate in the selected machining process.

The sixth aspect, the twenty-ninth aspect, and the fifty-second aspect make it easier to find a machining process that has a higher cutting power parameter in the machining program as a whole.

The seventh aspect, the thirtieth aspect, and the fifty-third aspect make it easier to determine whether there is a machining process for which an adjustment should be considered over the selected machining process.

The eighth aspect, the thirty-first aspect, and the fifty-fourth aspect make it easier to determine whether the selected tool has been used for a long period of time in the machining program and/or whether a load has concentrated on the selected tool. This makes it easier to determine whether it is necessary to exchange the selected tool with another tool in some machining process.

The ninth aspect, the thirty-second aspect, and the fifty-fifth aspect ensure that even if the machining program has not been executed in the machine tool yet, a graph that shows a cutting power parameter in a time-series manner can be generated, and/or the tools can be sorted based on the cutting power parameter.

In the tenth aspect, the thirty-third aspect, and the fifty-sixth aspect, a machining way in which the workpiece is machined in the selected machining process can be displayed. This makes it even easier to determine whether it is necessary to exchange the tool and/or it is necessary to change the machining process.

In the eleventh aspect, the thirty-fourth aspect, the fifty-seventh aspect, all machining ways in which the workpiece is machined using the selected tool can be displayed. This makes it even easier to determine whether it is necessary to exchange the tool.

The twelfth aspect, the fourteenth aspect, the thirty-fifth aspect, the thirty-seventh aspect, the fifty-eighth aspect, and the sixtieth aspect make it even easier to determine whether it is necessary to exchange the tool with reference to a characteristic of the selected tool or the in-use tool.

The thirteenth aspect, the fifteenth aspect, the thirty-sixth aspect, the thirty-eighth aspect, the fifty-ninth aspect, and the sixty-first aspect make it even easier to determine whether it is necessary to exchange the tool with reference to at least one of: the lifetime of the selected tool or the in-use tool; and a durable number of execution of the machining program in which the selected tool is used.

In the sixteenth aspect, the thirty-ninth aspect, and the sixty-second aspect, a period of time in which the cutting power parameter is high can be selected from the graph, and the corresponding machining process can be displayed. This further increases the efficiency with which the machining program is examined for improvements.

The seventeenth aspect, the fortieth aspect, and the sixty-third aspect make it easier to consider whether to change at least one of the cutting depth, the feed rate, the cutting speed, and the rotational speed of the spindle in the machining process corresponding to the period of time in which the cutting power parameter is high.

In the eighteenth aspect, the forty-first aspect, and the sixty-fourth aspect, a machining way in which the workpiece is machined in the machining process corresponding to the period of time in which the cutting power parameter is high can be displayed. This makes it even easier to determine whether it is necessary to exchange the tool and/or it is necessary to change the machining process.

The nineteenth aspect, the forty-second aspect, and the sixty-fifth aspect make it even easier to determine whether it is necessary to exchange the tool with reference to a characteristic of the tool used in the machining process corresponding to the period of time in which the cutting power parameter is high.

The twentieth aspect, the forty-third aspect, and the sixty-sixth aspect make it easier to find, in the machining program, at least one of a tool having a long period of usage time, a tool that cuts a large volume of cut part, a tool having a long path length, a tool having a large average value of the cutting power parameter, a tool having a large maximum value of the cutting power parameter. This further improves users' convenience.

The twenty-first aspect, the forty-fourth aspect, and the sixty-seventh aspect make it easier to determine a limitation of the cutting speed with reference to the above-described output power ratio.

In the twenty-second aspect, the forty-fifth aspect, and the sixty-eighth aspect, the plurality of tools are displayed in turn based on the maximum value of load information of the machining processes in which the tools are used. This makes it easier to find a machining process in which the value of the load information is high.

In the twenty-third aspect, the forty-sixth aspect, and the sixty-ninth aspect, the plurality of tools are displayed in turn based on the sum of the load information of the machining processes in which the tools are used. This make it easier to intuitively find a tool having a large value of load information.

The technique disclosed in the present application makes it easier for an operator to, for example, find a high-load tool from among tools used in an operation and find a reason why the load is high on the tool.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Also in the present application, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

What is claimed is:
1. A tool load display method comprising:
  inputting a machining program that specifies a plurality of tools used during machining work and that specifies machining processes which constitute the machining work and each of which is performed by using each of the plurality of tools;

calculating at least one piece of load information corresponding to each of the plurality of tools during each of the machining processes;

assigning the at least one piece of load information to each of the plurality of tools;

selecting selected load information from the at least one piece of load information;

determining a displaying order of the plurality of tools based on the selected load information assigned to each of the plurality of tools;

displaying on a display of a machine tool, the plurality of tools in the displaying order;

displaying, next to each of the plurality of tools, at least one machining process performed by using each of the plurality of tools, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools being defined in the at least one machining process; and displaying, upon selecting a selected machining process from the at least one machining process displayed, the cutting speed and the feed rate corresponding to the selected machining process and the cutting speed and the feed rate corresponding to a different machining process which is different from the selected machining process and in which each of the plurality of tools is used such that the cutting speeds are comparable with each other and the feed rates are comparable with each other.

2. The tool load display method according to claim 1, wherein the displaying order is determined based on a maximum value of the selected load information assigned to each of the plurality of tools.

3. The tool load display method according to claim 2, wherein the displaying order is an ascending order or a decreasing order of the maximum value.

4. The tool load display method according to claim 1, wherein the displaying order is determined based on a sum of the selected load information assigned to each of the plurality of tools.

5. The tool load display method according to claim 4, wherein the displaying order is an ascending order or a decreasing order of the sum.

6. The tool load display method according to claim 1, further comprising displaying at least one of the cutting depth, the feed rate, the cutting speed, and the rotational speed of the spindle in association with the selected machining process.

7. The tool load display method according to claim 6, further comprising calculating, based on the cutting depth, the feed rate, and the cutting speed, a cutting power parameter corresponding to cutting power applied to each of the plurality of tools.

8. The tool load display method according to claim 1, further comprising displaying: a movement path of an in-use tool used in the selected machining process; or a machined part of a workpiece machined by using the in-use tool in the selected machining process.

9. The tool load display method according to claim 8, further comprising displaying, upon selecting a selected tool from the plurality of tools displayed: movement paths of the selected tool in all machining processes in which the selected tool is used; or the machined part of the workpiece machined using the selected tool.

10. The tool load display method according to claim 1, further comprising displaying, upon selecting a selected tool from the plurality of tools displayed, a characteristic of the selected tool.

11. The tool load display method according to claim 10, further comprising displaying, together with the characteristic of the selected tool.

12. A tool load display method comprising:

inputting a machining program that specifies a plurality of tools used during machining work and that specifies machining processes which constitute the machining work and each of which is performed by using each of the plurality of tools;

calculating at least one piece of load information corresponding to each of the plurality of tools during each of the machining processes;

assigning the at least one piece of load information to each of the plurality of tools;

selecting selected load information from the at least one piece of load information;

determining a displaying order of the plurality of tools based on the selected load information assigned to each of the plurality of tools;

displaying on a display of a machine tool, the plurality of tools in the displaying order;

displaying, next to each of the plurality of tools, at least one machining process performed by using each of the plurality of tools, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools being defined in the at least one machining process; and displaying a graph that shows, in a time-series manner, a cutting power parameter corresponding to cutting power applied to each of the plurality of tools between a start and an end of the machining program.

13. The tool load display method according to claim 12, further comprising, upon selecting a selected machining process from the at least one machining process displayed, highlighting a period of time in which the selected machining process is performed.

14. The tool load display method according to claim 13, further comprising, upon selecting a selected tool from the plurality of tools displayed, highlighting a period of time in which all machining processes in which the selected tool is used are performed.

15. A machine tool comprising:

a display;

a memory to store a machining program that specifies a plurality of tools used during machining work and that specifies machining processes which constitute the machining work and each of which is performed by using each of the plurality of tools; and a processor configured to:
calculate at least one piece of load information corresponding to each of the plurality of tools during each of the machining processes;

assign the at least one piece of load information to each of the plurality of tools;

select selected load information from the at least one piece of load information;

determine a displaying order of the plurality of tools based on the selected load information assigned to each of the plurality of tools;

display the plurality of tools in the displaying order on the display;

display on the display, next to each of the plurality of tools, at least one machining process performed by using each of the plurality of tools, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools being defined in the at least one machining process; and display, upon selecting a selected machining process from the at least one machining process displayed, on the display, the cutting speed and the feed rate corresponding to the selected machining process and the cutting speed and the feed rate corresponding to a different machining process which is different from the selected machining process and in which each of the plurality of tools is used such that the cutting speeds are comparable with each other and the feed rates are comparable with each other.

16. A non-transitory computer-readable storage medium storing a program for causing a computer to execute processing comprising:

inputting a machining program that specifies a plurality of tools used during machining work and that specifies machining processes which constitute the machining work and each of which is performed by using each of the plurality of tools;

calculating at least one piece of load information corresponding to each of the plurality of tools during each of the machining processes;

assigning the at least one piece of load information to each of the plurality of tools;

selecting selected load information from the at least one piece of load information;

determining a displaying order of the plurality of tools based on the selected load information assigned to each of the plurality of tools;

displaying on a display of a machine tool, the plurality of tools in the displaying order;

displaying, next to each of the plurality of tools, at least one machining process performed by using each of the plurality of tools, at least one of: a cutting depth of each of the plurality of tools relative to a workpiece; a feed rate of the workpiece; a cutting speed of cutting the workpiece; and a rotational speed of a spindle configured to rotate the workpiece or each of the plurality of tools being defined in the at least one machining process; and displaying the cutting speed and the feed rate corresponding to the selected machining process and the cutting speed and the feed rate corresponding to a different machining process which is different from the selected machining process and in which each of the plurality of tools is used such that the cutting speeds are comparable with each other and the feed rates are comparable with each other.

* * * * *